(12) United States Patent
Shindou et al.

(10) Patent No.: US 6,623,336 B2
(45) Date of Patent: Sep. 23, 2003

(54) MAGNETIC HEAD POLISHING DEVICE AND METHOD THEREOF

(75) Inventors: Hiroshi Shindou, Tokyo (JP); Masahiro Sasaki, Tokyo (JP); Akio Ogawa, Tokyo (JP); Tetsuo Abe, Tokyo (JP); Masaki Kouzu, Tokyo (JP); Masao Yamaguchi, Tokyo (JP)

(73) Assignee: TDK Corporation, Tokyo (JP)

( * ) Notice: Subject to any disclaimer, the term of this patent is extended or adjusted under 35 U.S.C. 154(b) by 163 days.

(21) Appl. No.: 09/788,558

(22) Filed: Feb. 21, 2001

(65) Prior Publication Data

US 2001/0018315 A1 Aug. 30, 2001

(30) Foreign Application Priority Data

Feb. 22, 2000 (JP) ........................................ 2000-044269

(51) Int. Cl.⁷ .............................. B24B 9/00; B24B 7/00
(52) U.S. Cl. .............................. 451/41; 451/158; 451/5; 451/55; 451/276; 451/279; 451/387
(58) Field of Search .......................... 29/603.16; 451/5, 451/10, 11, 12, 41, 55, 59, 63, 276, 278, 279, 285–290, 364, 387, 397, 398, 158

(56) References Cited

U.S. PATENT DOCUMENTS

| | | |
|---|---|---|
| 4,689,877 A | 9/1987 | Church |
| 5,065,483 A | 11/1991 | Zammit |
| 5,210,667 A | 5/1993 | Zammit |
| 5,620,356 A | 4/1997 | Lackey et al. |
| 5,951,371 A * | 9/1999 | Hao ................................ 451/5 |
| 5,993,290 A | 11/1999 | Yoshihara et al. |
| 6,045,431 A * | 4/2000 | Cheprasov et al. ............. 451/5 |
| 6,217,425 B1 * | 4/2001 | Shindou et al. ........... 29/603.16 |

FOREIGN PATENT DOCUMENTS

| | | |
|---|---|---|
| JP | 60-076011 | 4/1985 |
| JP | 2-095572 | 4/1990 |
| JP | 5-44085 | 7/1993 |
| JP | 7-112672 | 12/1995 |
| JP | 11-016124 | 1/1999 |

\* cited by examiner

Primary Examiner—Timothy V. Eley
(74) Attorney, Agent, or Firm—Oblon, Spivak, McClelland, Maier & Neustadt, P.C.

(57) ABSTRACT

When electric elements are formed on a ceramic bar or the like, the positional displacement of the respective elements occurs due to a division exposing process or the like. An object of the present invention is to provide a device and a method which unify the non-polished portion of the respective elements by conducting polishing while a complicated deformation or the like is given to the ceramic bar. To achieve this object, the ceramic bar or like is held by using a jig, and a plurality of loads are applied to portions of the jig where the ceramic bar or the like is held, to thereby deform the ceramic bar or the like and polish the element in that state. In this situation the load applied points are disposed so as to avoid the boundaries of the division exposure.

17 Claims, 17 Drawing Sheets

MAGNETIC HEAD POLISHING DEVICE AND METHOD THEREOF

BACKGROUND OF THE INVENTION

1. Field of the Invention

The present invention relates to a magnetic head polishing device for polishing an object to be polished where a plurality of magnetic heads are disposed and a magnetic head polishing method, and more particularly to a device for correcting a bend of the workpiece or object to be polished at the time of polishing.

2. Related Background Art

A thin film magnetic head used in a magnetic disk device or the like is made up of parts obtained by machining a bar-shaped ceramics (hereinafter referred to "ceramic bar") where a large number of element parts made of magnetic thin films and the like, which form an induced magnetic conversion element or a magnetic resistor element (hereinafter referred to as "MR element") and the like, are formed on a surface in a line. The large number of element parts are formed on a wafer-shaped ceramic substrate at the same time, and the ceramic substrate is cut into a bar shape in one direction, to thereby obtain the above-mentioned ceramic bar.

The large number of element parts are formed on the wafer-shaped ceramic substrate at the same time with the use of a thin film forming and processing technique represented by a semiconductor manufacturing technique. In this process, the respective thin films for magnetic resistance measurement, a magnetic pole, a coil, insulation, and the like, are subjected to film formation, photoresist coating, exposure of a wiring shape, and the like, the removal of the photoresist on a portion to be exposed, a film etching on the portion to be exposed, the removable of the photoresist on an exposing portion, and the like. Thereafter, a protective film is formed on the uppermost portion, and a process of forming the element portion is completed.

In addition, in the next process, a ceramic bar formed with a plurality of element parts is subjected to a polishing process that machines a throat height, an MR height, or the like of each element part to an appropriate value, and other processes. In general, in the magnetic disk device, in order to stabilize the output characteristic from the magnetic head, it is necessary to keep a distance between the magnetic pole portion of the magnetic head and a recording medium surface to a very narrow constant distance. The throat height or the MR height becomes an important parameter that regulates this distance.

In a subsequent process, the ceramic bar is separated into the respective element parts, individually, and the respective element parts constitute one part of the magnetic head for the magnetic disk device. When the magnetic head is used for the magnetic disk device, the ceramic portion becomes a slider that floats due to an air pressure by the rotation of a disk on the magnetic disk, and the element portion becomes a head core that conducts the record and/or reproduction of a magnetic signal of the disk.

The throw height is regulated by a magnetic pole leading portion that conducts the record and reproduction of a magnetic signal in the above head core, and is directed to the length (height) of a portion of two magnetic poles that face each other with a fine gap therebetween. The MR height is directed to the length (height) from an end portion on the side of the surface facing the medium of the MR element to the opposite end portion. In order to enable an appropriate recording and reproduction of the signal, it is needed that the values of the throat height and the MR height are set to given values, and a high precision is required for polishing process in order to obtain the given values.

However, in general, the above ceramic bar has a distortion, a bend or the like due to a stress caused by cutting of the respective element portions from the ceramic substrate or the formation of the element portions, and the like, and it is difficult to obtain the above-mentioned high processing accuracy only by fixing the ceramic bar to conduct the polishing process. For that reason, there has been proposed a device for polishing the magnetic head in the form of a ceramic bar with a high precision as disclosed, for example, in U.S. Pat. No. 5,620,356, instead of the general polishing device. Also, the present applicants have proposed such devices and methods (Japanese Patent Application No. 11-162799, and the like).

A method of polishing the above ceramic bar in fact will be described below.

First, a counter surface to the polished surface of the ceramic bar is stuck on a jig by means of an adhesive or the like, and the surface to be polished of the ceramic bar is pushed toward a polishing surface of a polishing bed or base through the jig, to thereby polish the surface to be polished. The jig is of a beam structure, and a load is given to specific points three to seven on the jig from the outside of the jig, to thereby deform the jig per se. In addition, the beam structure facilitates a portion to which the ceramic bar is stuck to be complicatedly deformed by the above load and also can correct the bend or the like of the ceramic per se by bending the stuck ceramic bar at the same time.

During polishing, the value of the throat height or the like is optically or electrically measured on a given element portion on the ceramic bar fixed by the jig, and a difference between the measured value and a desired value, that is, a polishing amount required at the time of measurement is obtained. The loads at a plurality of points are adjusted on the basis of the required polishing amount at an obtained predetermined element portion and a portion close to the element portion, and a process of conducting polishing while deforming the ceramic bar through the jig is repeated, to thereby fall values of the throat height or the like of all the elements formed in the ceramic bar within a given range.

In the above process, the jig is made into a beam structure in order to make the deformation easy, and an opening portion into which a pin or the like that gives a load is inserted is defined in the beam portion. A load caused by an actuator such as a low frictional cylinder is transmitted to the pin through a transmission part, to thereby deform the entire jig and deform the ceramic bar fixed to a part of the jig, or adjust a load on the respective ceramic bar portions. A specific example of the jig that conducts the effective deformation or the load diffusion on the ceramic bar is disclosed in Japanese Patent Application No. 10-178949 made by the present applicants.

However, as the recording density of the magnetic recording medium is made high, an error range which is allowed to the value of the throat height or the like during the polishing process becomes narrower. In order to comply with this requirement in the above conventional device, it is necessary to give a fine deformation by a ceramic bar holding portion. However, in order to obtain the fine deformation, more points to which the load is applied are disposed, and a device that can give larger loads to those points is required. Taking the size of the actuator having a required stroke, and the like, into consideration, it is difficult to structure an actual device. Also, the jig of the conventional device in which the entire jig is always deformed is naturally improper in deforming the respective parts, independently.

For that reason, the present applicant has proposed a method in which a main load that presses the ceramic bar against the polishing surface is given by about one to three actuators, and pressing forces from a plurality of micro-actuators small in stroke are directly effected on the portion that holds the ceramic bar for fine adjustment. According to this method, the micro-actuator small in stroke, and the like, can be employed by directly effecting the pressing force onto the ceramic bar holding portion, and a problem on a space to which the actuator is attached is eliminated. In addition, a specific portion of the ceramic bar holding portion can be pressed, thereby being capable of more finely correcting the bend of the ceramic bar.

As described above, an error allowed to the machining of the throw height or the like becomes smaller with time, and at present, a precision of, for example, ±0.01 μm or less is required within the ceramic bar. The polishing is conducted while the bend of the ceramic bar, or the like, is corrected, for example, by using the above method proposed by the present applicant, thereby being capable of obtaining the above precision. However, the element which has been actually formed in a ceramic bar shape has an error in the formation position caused in the element forming process at the same time. For example, in the case of exposing the photoresist, there is a case where an exposure process is not conducted on all the portions on the wafer at the same time, but an upper surface of the wafer is divided into a plurality of portions, and the exposure process is conducted on the respective portions. In general, there has been known that the positioning at the time of exposure by an exposing device has an error of 0.01 to 0.05 μm.

Similarly, when being viewed in a longitudinal direction, the element on one ceramic bar is subjected to an exposure process where the element is divided into a plurality of portions. The positional displacement of the element caused by this exposure process may largely exceed the above requested precision in degree depending on the displacement direction, and the positional displacement needs to be corrected in addition to the correction to the bend of the above ceramic bar.

In addition, in the above element forming process, processes such as the film formation, the exposure and the etching are conducted with respect to a plurality of thin films, and errors in the thickness direction of the thin film, in the width direction of a wiring and in the longitudinal direction of the wiring are caused in the respective processes. Those errors are caused within a region which is exposed at one time, and all of those errors are superimposed on each other and detected as positional errors between the respective elements in the polishing direction and as a difference of the required polishing amount for each of the elements in adjusting the throat height or the like.

In the case where an attempt is made to eliminate the respective factors that cause those errors, it is considered that the machining allowable values allowed in the respective processes are made as small as possible. However, in the case where the machining allowable values are made small, there are presumed demerits such as the deterioration of the yield caused by producing the elements out of the allowable range, and an increase in the machining period of time for enhancing the exposure precision, which is not practical.

Also, it is proposed that attention is paid to only the positional displacement in the exposure process, and only a region which is exposed at one time is divided and machined. However, similarly, this process leads to an increase in the costs which are required for the machining device or a reduction of productivity of the machining device and therefore is not practical.

SUMMARY OF THE INVENTION

The present invention has been made under the above circumstances, and therefore an object of the present invention is to provide a device which can give a complicated bent deformation to an object to be polished such as a ceramic bar in accordance with the positional displacements of respective elements which are caused by an exposure processing or the like, whereby the amount of polishing the object to be polished is adjusted to unify the non-polished portion of the respective elements in a process of polishing the object to be polished.

In order to solve the above problem, according to the present invention, there is provided a polishing device for polishing an object to be polished which is elongated in one direction, in which a plane of the object to be polished extending in the longitudinal direction is divided into a plurality of regions, and a plurality of elements each consisting of at least one of an electromagnetic conversion element and a magnetoelectric conversion element are formed in the longitudinal direction in each of the divided regions, the polishing device comprising a polishing bed having a polishing surface which is rotationally driven, a polishing head mounted frame movably disposed on the polishing surface, and a polishing head supported by the polishing head mounted frame, characterized in that the polishing head includes a jig that has a holding portion that extends in a longitudinal direction and holds the object to be polished at a given position of the holding portion, a support portion that supports the jig, an elevating portion that is integrated with the support portion and elevates with respect to the polishing surface, and a plurality of holding portion deforming means that give a load which deforms the holding portion and the object to be polished to the holding portion, and that the holding portion deforming means are disposed so as not to give the load on boundaries between the plurality of regions.

The division of the plane of the object to be polished which extends in the longitudinal direction into the plurality of regions is caused, for example, by conducting the above-mentioned division exposure. Also, the holding portion deforming means may be disposed on the jig or may be disposed independently from the jig.

Also, in order to solve the above problem, according to the present invention, there is provided a polishing device for polishing an object to be polished which is elongated in one direction, in which a plurality of elements each consisting of at least one of an electromagnetic conversion element and a magnetoelectric conversion element are formed in the longitudinal direction on a plane that extends in the longitudinal direction, the polishing device comprising a polishing bed having a polishing surface which is rotationally driven, a polishing head mounted frame movably disposed on the polishing surface and a polishing head supported by the polishing head mounted frame, characterized in that the polishing head includes a jig that has a holding portion that extends in a longitudinal direction and holds the object to be polished at a given position of the holding portion, a support portion that supports the jig, an elevating portion that is integrated with the support portion and elevates with respect to the polishing surface, and a plurality of holding portion deforming means that give a load which deforms the holding portion and the object to be polished to the holding portion, and that the holding portion deforming means are disposed so as to give the load to the plurality of elements, independently.

Also, the holding portion deforming means may be disposed on the jig or may be disposed independently from the jig. In addition, it may be that the polishing head includes an actuator, the jig has a through-hole disposed in a direction perpendicular to a direction along which the holding portion deforming means gives the load in the center of the longitudinal direction, the jig is supported on the support portion by a support pin that penetrates the through-hole, and the actuator effects a force that pushes or pulls up the jig in a direction perpendicular to the polishing surface through the support pin.

Further, it may be that the polishing head has a correcting actuator, and the support portion has a positioning pin, the jig has a recess disposed in a direction perpendicular to the direction along which the holding portion deforming means gives the load on both of ends in the longitudinal direction, the jig is positioned by the positioning pin inserted into the recess, and the correcting actuator adjusts a press force with respect to the polishing surface of the jig through the positioning pin. In addition, the polishing head may have an adjust ring elastically supported by the polishing head mounted frame, and the adjust ring is in contact with the polishing surface while being elastically supported by the polishing head mounting frame so that an angle facing the polishing surface may be regulated by the adjust ring.

Still further, the polishing head may be rotatably attached on the polishing head mounting rail. Also, the polishing device may have a polishing head swinging means, and the polishing head swinging means may allow the polishing head to conduct the reciprocatingly rotating motion within a given angle range. In addition, the polishing device may include a means for detecting the required polishing amount of the object to be polished and a drive means for driving the plurality of holding portion deforming means on the basis of the detected required polishing amount. Also, the object to be polished may be made of bar-shaped ceramic where a plurality of magnetic heads are formed.

Yet still further, in order to solve the above problem, according to the present invention, there is provided a polishing method of an object to be polished which is elongated in one direction, in which a plane of the object to be polished extending in the longitudinal direction is divided into a plurality of regions, and a plurality of elements each consisting of at least one of an electromagnetic conversion element and a magnetroelectric conversion element are formed in the longitudinal direction in each of the divided regions, the polishing method comprising, a step of holding the object to be polished by the jig, substantially uniformly pressing the object to be polished, toward the polishing surface formed on the polishing bed rotatably driven, through the jig in the longitudinal direction, and polishing the object to be polished, characterized in that when the object to be polished is substantially uniformly pressed toward the polishing surface, a load for adjusting the deformation amount in the periphery of the load applied points of the object to be polished in a plurality of load applied points in the longitudinal direction is given to the object to be polished in addition to the substantially uniform press, and the load applied points are disposed other than the boundary portions of the plurality of divided regions. Also, it is preferable that the load applied points are close to the boundary portions and disposed at both sides thereof.

Yet still further, in order to solve the above problem, according to the present invention, there is provided a polishing method for polishing an object to be polished which is longitudinal in one direction, in which a plurality of elements each consisting of at least one of an electromagnetic conversion element and a magnetroelectric conversion element are formed in the longitudinal direction on a plane that extends in the longitudinal direction, the polishing method comprising, a step of holding the object to be polished by the jig, substantially uniformly pressing the object to be polished, toward the polishing surface formed on the polishing bed rotatably driven, through the jig in the longitudinal direction, and polishing the object to be polished, characterized in that when the object to be polished is substantially uniformly pressed toward the polishing surface, a load for adjusting the deformation amount of the portion on which the plurality of elements of the object to be polished are formed, respectively, is given to the plurality of elements, independently, in addition to the substantially uniform press. Also, it is preferable that the load is given to the plurality of elements except for the center portion between the respective elements.

DESCRIPTION OF THE PREFERRED EMBODIMENTS

Figure 1:
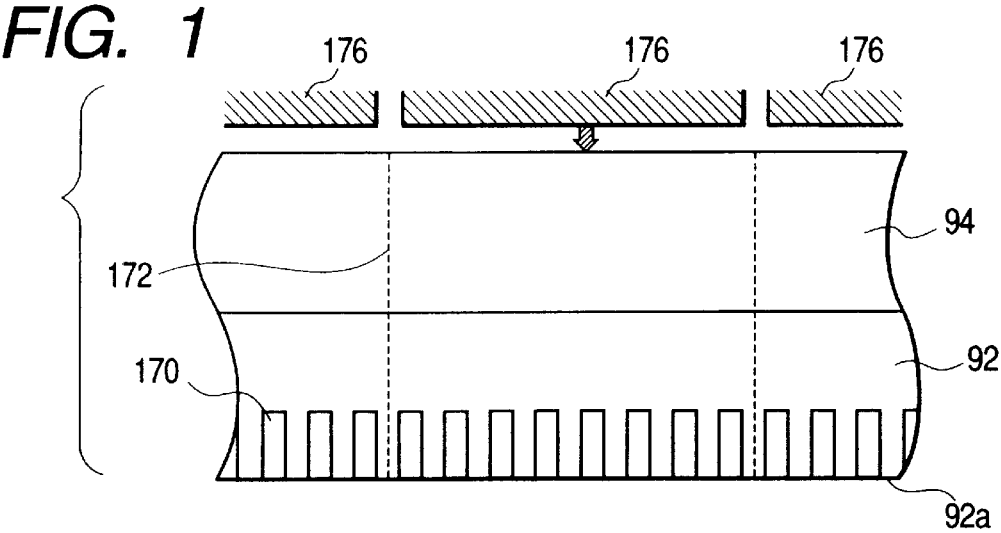
FIG. 1 is an explanatory diagram showing an example of a position to which a single load is applied in the case where the load is applied to one exposure region to deform an object to be polished.

Now, a description will be given in more detail of a ceramic bar deforming method in accordance with embodiments of the present invention with reference to the accompanying drawings. Note that since an object to be actually polished is not limited to a ceramic bar, the ceramic bar is called "object to be polished" hereinafter. FIG. 1 shows the outline of an example of a method of deforming an object to be polished. An object to be polished 92 is formed with a plurality of elements 170 on a surface to be polished 92a side, and an opposite surface is fixed to a lateral longitudinal jig 94. Although there are many cases in which exposure boundaries 172 formed by the respective exposing processes in a divided exposure conducted at the time of forming the elements are not actually observed as distinct boundaries, those exposure boundaries are indicated by broken lines in this example, for convenience.

As described above, there are various factors that cause errors in element forming positions. However, one of the largest factors is directed to the positional displacement in the respective exposing processes in the divided exposure. In the present invention, as shown in FIG. 1, a plurality of load applied regions 176 are determined in accordance with the respective exposure positions, and the loads are applied such that a holding portion for the lateral longitudinal jig 94 and the object 92 to be polished are deformed in each of the regions 176, thereby being capable of adjusting the polishing amount at each of the exposure positions.

Figure 2:
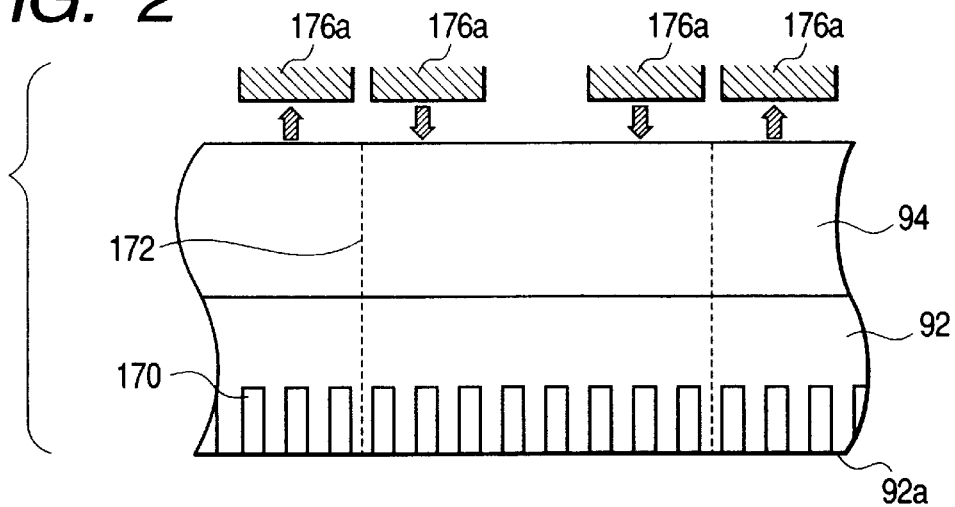
FIG. 2 is an explanatory diagram showing an example of positions to which a plurality of loads are applied in the case where the loads are applied to one exposure region to deform an object to be polished.

As shown in FIG. 1, in the case where a single load is applied to a specific exposure position to adjust the polishing amount, there is a fear that a given deformation amount cannot be given to the object 92 or the like in the vicinity of the exposure boundaries 172. This problem can be overcome by determining a plurality of load applied points 176a on the load applied regions 176 and adjusting the magnitude of each of the load applied points 176a. The structure is shown in FIG. 2. However, in this case, it is necessary that all of the load applied points 176a are disposed so as to avoid the exposure boundaries 172. Also, if the load applied points 176a in the vicinity of the exposure boundaries 172 are disposed at positions close to the exposure boundaries 172, the positional displacement caused in the exposing process can be corrected so that a more appropriate deformation can be given to the object 92 in polishing.

Figure 3:
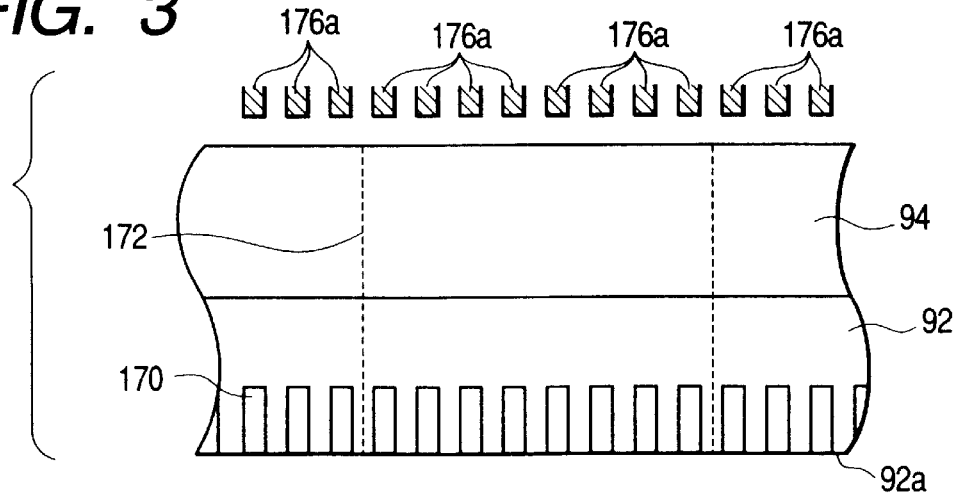
FIG. 3 is an explanatory diagram showing an example of a position to which a single load is applied in the case where the load is applied to one element to deform an object to be polished.

Also, as described above, each of the elements actually suffers from an error in the formed position caused at the time of forming the element. Therefore, in order to polish the respective elements with high accuracy, as shown in FIG. 3, it is preferable to provide the load applied positions 176a on the respective elements. In addition, in order to give independent deformation amounts to the adjacent elements, it is more preferable to provide a plurality of the load applied points 176a on the respective elements.

If the load applied points are provided and the object 92 is deformed during the polishing process, it is possible to correct the bend of the object to be polished 92, and the like, and at the same time, to correct the positional displacement of each of the elements which is caused at the time of forming the element. As a result, since high-precision polishing can be conducted, the throat height and the like excellent in precision in each of the elements can be formed.

First Embodiment

Figure 4:
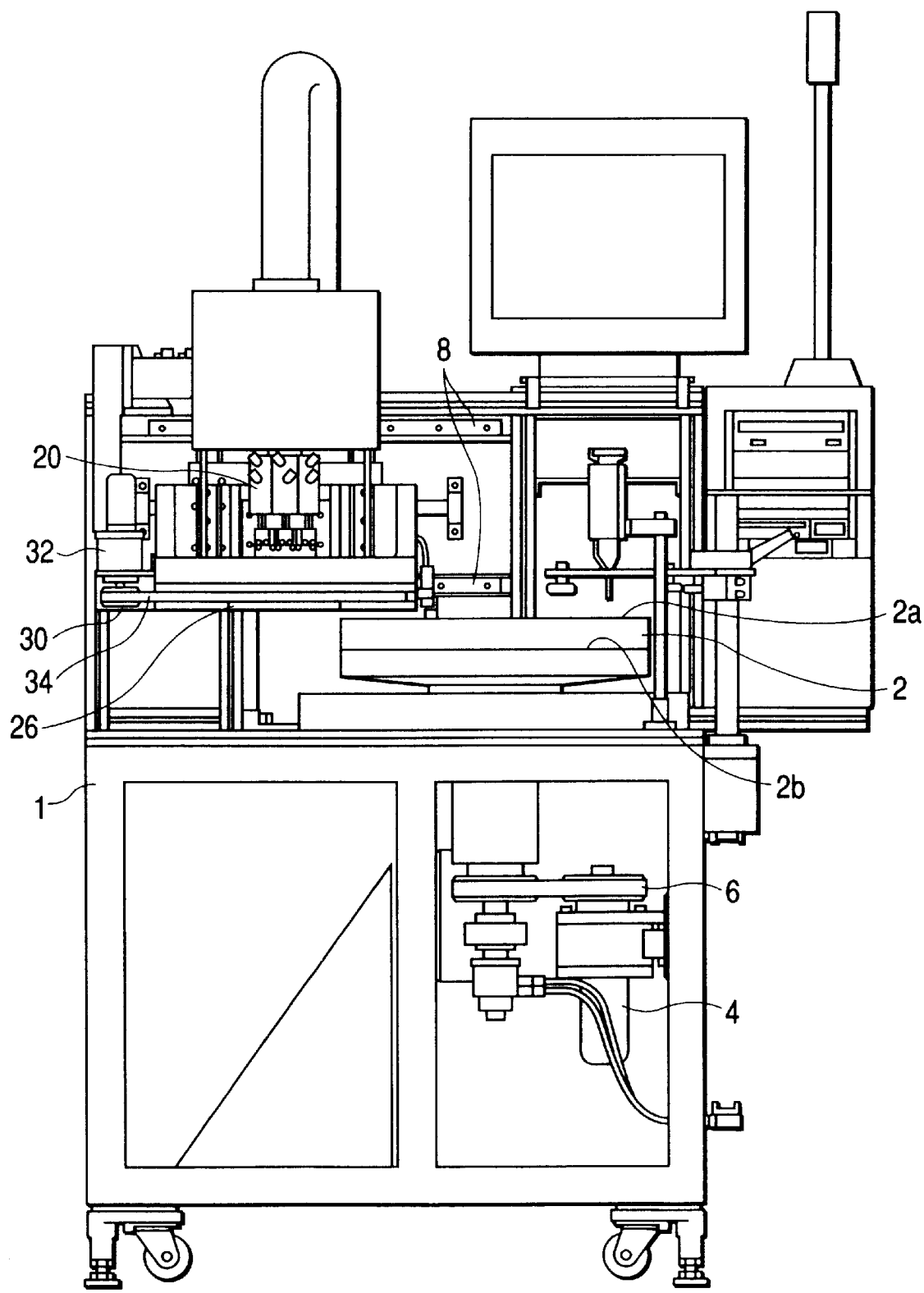
FIG. 4 is a front view showing a magnetic head polishing device in accordance with a first embodiment of the present invention.
Figure 5:
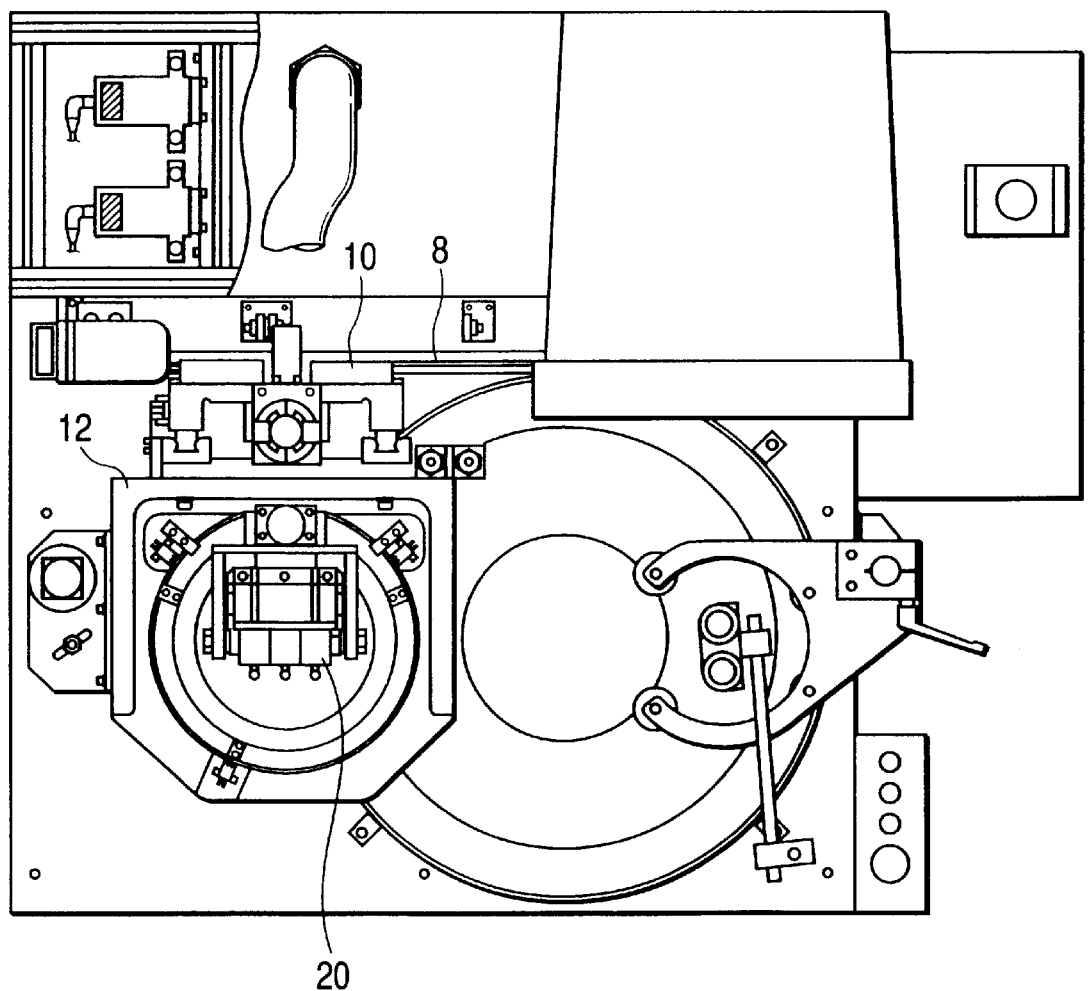
FIG. 5 is a plan view showing the magnetic head polishing device in accordance with the first embodiment of the present invention.

Now, a description will be given of an actual magnetic head polishing device in accordance with a first embodiment of the present invention with reference to the accompanying drawings. FIG. 4 is a front view showing the entire magnetic head polishing device in accordance with the first embodiment of the present invention, and FIG. 5 is a plan view thereof. The entire structure of the magnetic head polishing device will be described with reference to FIGS. 4 and 5. The magnetic head polishing device includes a base 1 to which a polishing bed 2 is rotatably supported on a horizontal plane, and the polishing bed 2 is rotationally driven by a bed drive motor 4 which serves as a rotation drive source and is disposed within the base 1 through a belt 6.

Also, a pair of guide rails 8 spaced from each other in a vertical direction are supported above the base 1 so as to extend horizontally, and a laterally moving slider 10 that is slidably guided in the horizontal direction by the pair of guide rails 8 is disposed. A polishing head mounted frame 12 is attached onto the laterally moving slider 10 so as to move vertically (which is vertically driven so that the height is freely adjustable). The drive of the laterally moving slider 10 can be executed, for example, by screwing a ball screw shaft which is in parallel with a guide rail 8 with a ball screw nut at the slider 10 side, and rotationally driving the ball screw shaft by a motor, and also the slider 10 and the polishing head mounted frame 12 can conduct the reciprocating linear motion.

Figure 6:
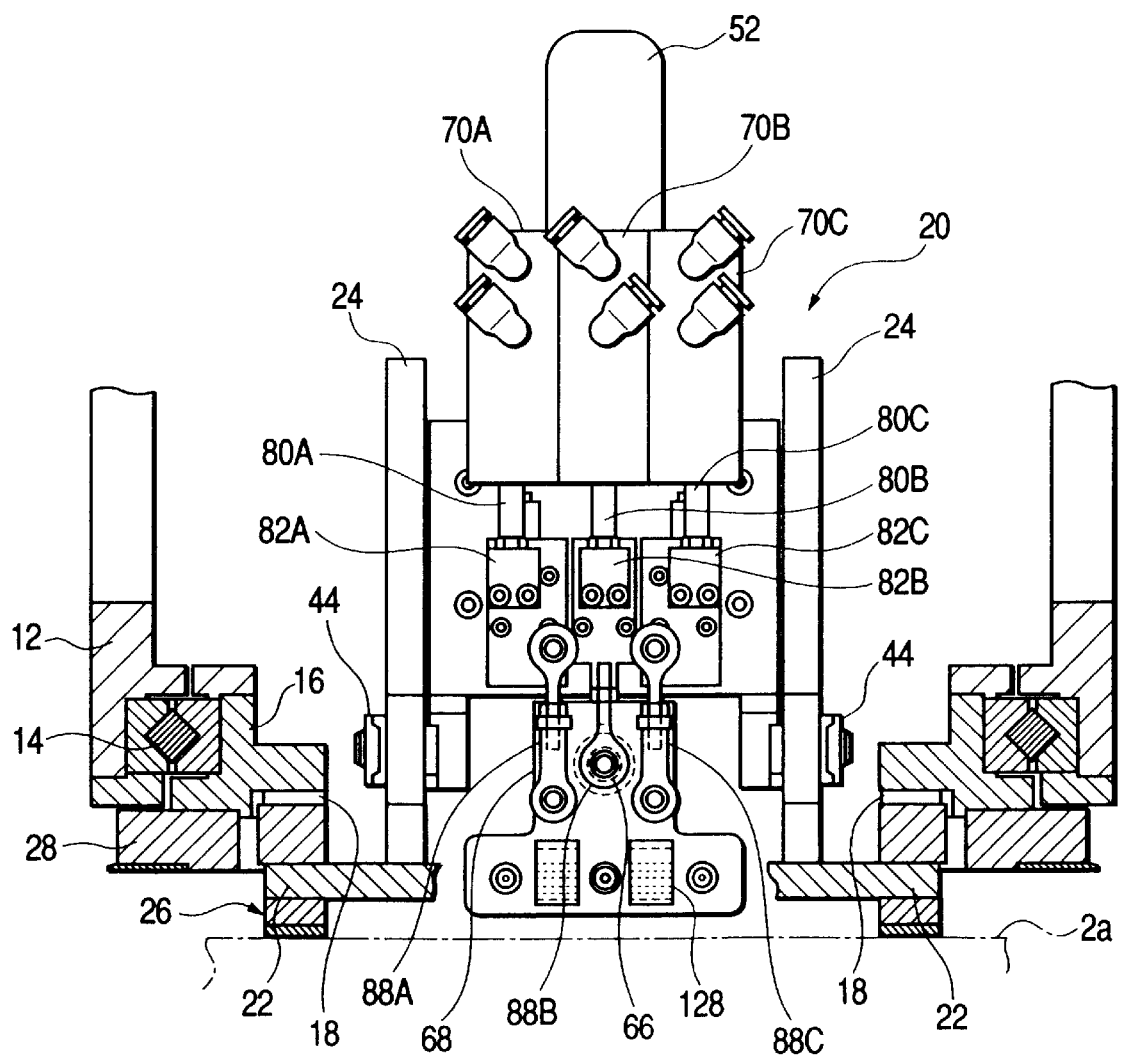
FIG. 6 is a front view showing a polishing head and the like in the magnetic head polishing device shown in FIG. 4.

As shown in FIG. 6, a rotation support portion 16 is rotatably supported to the inside of the polishing head mounted frame 12 through an annular shaft bearing portion 14, and the rotation support portion 16 is attached with a polishing head 20 through an elastic member 18 such as a plate spring or a rubber. The polishing head 20 includes a bottom plate 22 and a vertical support plates 24 which is fixed on the bottom plate 22 in parallel. Also, an adjust ring (wafer pad) 26 is fixed to a bottom surface of the bottom plate 22 of the polishing head 20. The adjust ring 26 is so adapted as to be in contact with the polishing surface 2a which is a top surface of the polishing bed 2. In the case where the polishing head 20 is held so that the posture of the polishing head is stable with respect to the polishing surface 2a, the adjust ring 26 can be removed with the member 18 as a rigid body.

As shown in FIGS. 5 and 6, the rotation support portion 16 is fixed with a belt pulley 28, and a polishing head swinging motor 32 that rotationally drives a belt pulley 30 is attached onto the outside of the polishing head mounted frame 12. A belt 34 is put around the belt pulleys 28 and 30. The motor 32, the belt pulleys 28, 30 and the belt 34 function as swinging means for allowing the polishing head 20 and the adjust ring 26 to conduct the reciprocating rotation motion (swinging motion) within a given angle range.

Figure 7:
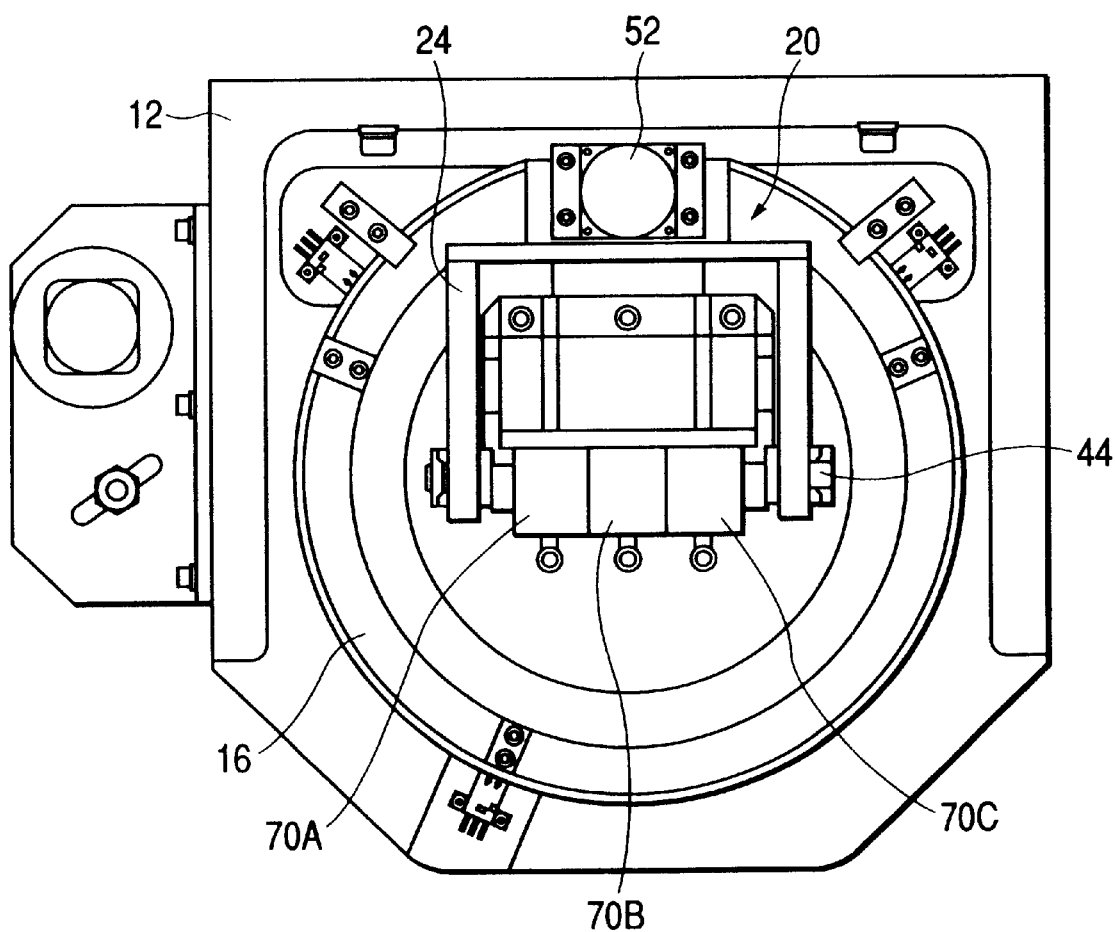
FIG. 7 is a plan view showing the polishing head shown in FIG. 6.
Figure 10:
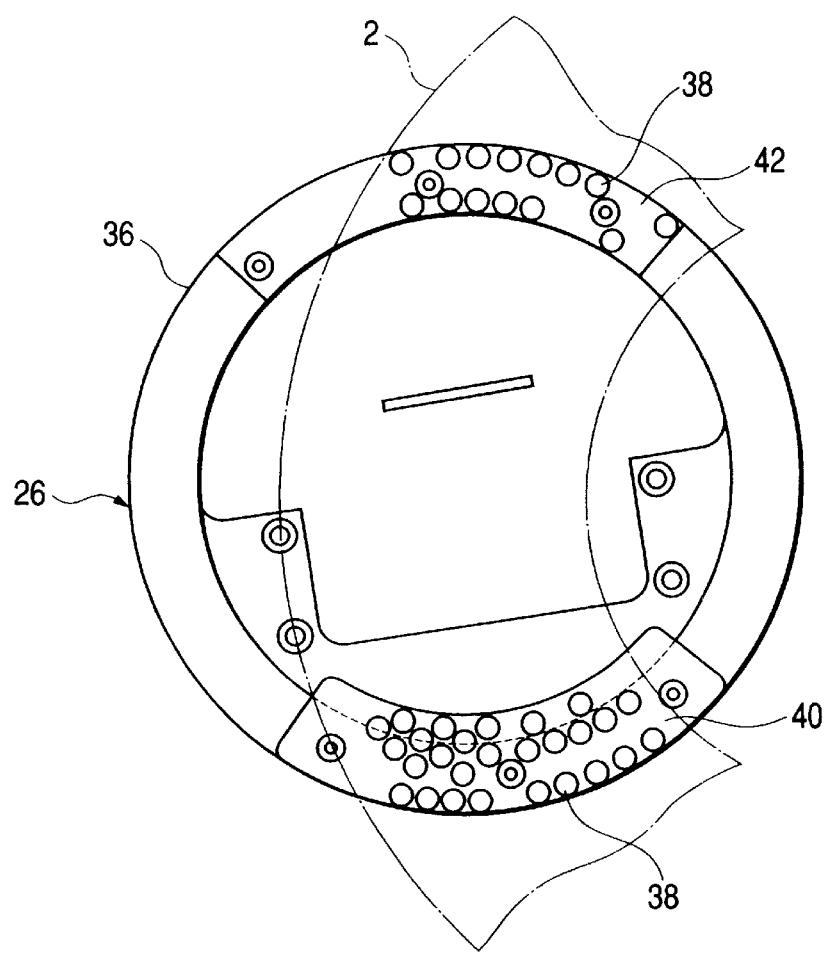
FIG. 10 is a bottom view showing an adjust ring in the polishing head shown in FIG. 6.

FIG. 10 is a bottom view showing the adjust ring. As shown in FIG. 10, the adjust ring 26 is designed in such a manner that a large number of columnar dummies 38 which are made of abrasion resistant ceramic are embedded in, for example, an aluminum ring body 36, and a lower end surface of the columnar dummies 38 slightly project from the ring body 36. The number of columnar dummies 38 is set in accordance with the weight balance of the polishing head 20 mounted on the adjust ring 26. In case of the adjust ring 26 shown in FIG. 7, because a circular portion 40 of the circular portions 40 and 42 of the adjust ring 26 which are opposite to and in contact with the polishing bed 2 receives a larger load from the polishing head 20, the number of columnar dummies 38 becomes larger.

As shown in FIGS. 6 to 9, a tilting shaft 44 which is in parallel with the lower surface of the polishing bed 2 is disposed between the polishing head 20 and the vertical support plate 24, and the tiling portion 46 is tiltably pivoted with respect to the polishing head 20 with the tilting shaft 44 as a center.

Figure 8:
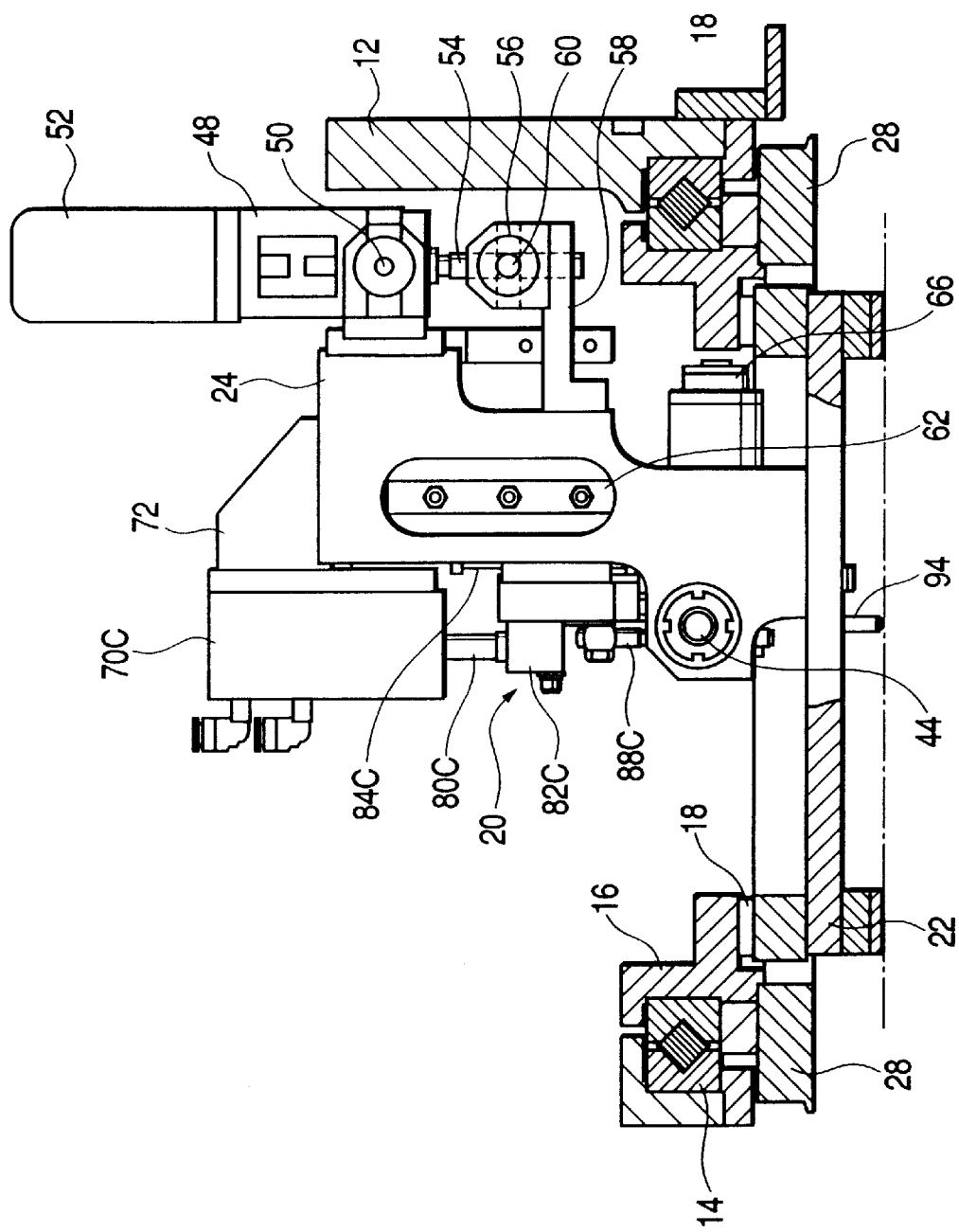
FIG. 8 is a side view showing the polishing head shown in FIG. 6.
Figure 9:
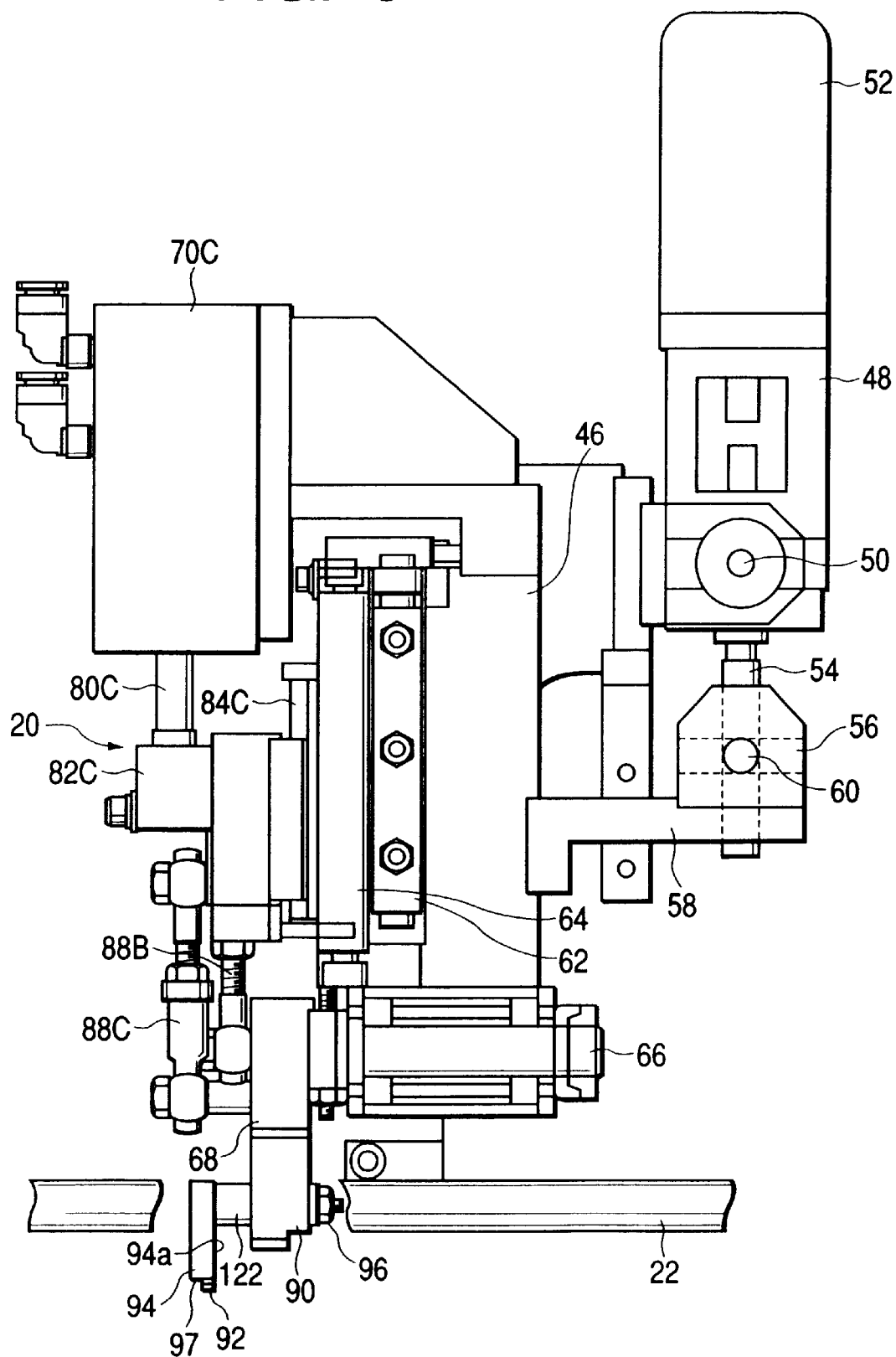
FIG. 9 is a cross-sectional side view showing the polishing head shown in FIG. 6.

As shown in FIGS. 8 and 9, a lower portion of a motor attachment seat portion 48 is attached to the vertical support plate 24 of the polishing head 20 so as to be rotatable about a fulcrum shaft 50, and a tilting motor 52 is fixed at an upper portion of the motor attachment seat portion 48. The rotation drive shaft of the motor 52 is connected with the ball screw shaft 54, and the ball screw shaft 54 is screwed with the ball screw nut 56. The ball screw nut 56 is connected to the other end of an arm 58 one end of which is fixed at the tilting portion 46 by a fulcrum shaft 60. The mechanism including the fulcrum shaft 50 to the fulcrum shaft 60, that is, the members 50 to 60 forms a tilting drive means that tilts the tilting portion 46 by a given angle from a state where the tilting portion 46 forms a surface perpendicular to the polishing surface 2a of the polishing bed 2.

An elevating portion 64 is attached to the tilting portion 46 in such a manner that an elevating portion 64 is vertically movable with respect to the tilting portion 46 through a slide bearing (cross roller guide) 62. Since the movement of the elevating portion 64 in the slidable direction is integrated with the tilting portion 46, the tilting portion 46 and the elevating portion 64 are always maintained in a parallel condition. A back plate 68 is pivoted at the lower end portion of the elevating portion 64 by a fulcrum shaft 66 which is orthogonal to the tilting shaft 44 and in parallel with the lower surface of the polishing bed 2.

As shown in FIGS. 6 and 8, actuators 70A, 70B and 70C are attached at the upper portion of the tilting portion 46 through bracket 72. Those actuators 70A, 70B and 70C push (push or positively press) or pull up (negatively press) the fulcrum shaft 66 of the back plate 68 as well as its right and left sides toward the polishing surface 2a in a perpendicular direction, respectively, and also control a load exerted on the back plate 68. In the present specification, the exertion of a force on the back plate 68 due to the above actuators is called simply "press".

Cylinder joints 82A, 82B and 82C each of which is made up of a screw, a nut, a sphere, or the like are connect to the lower ends of the rods 80A, 80B and 80C of actuators 70A, 70B and 70C, so as to make the cylinder joints 82A, 82B and 82C vertically movable along slide bearings 84A, 84B and 84C attached to the elevating portion 64. Each of those cylinder joints is rotatable by about 5° with respect to the elevating angle of each of the actuators so as to correct the displacement of the axes of the cylinder joints and the actuators, and the like. The lower end sides of those cylinder joints 82A, 82B and 82C are connected to the center, the right and left sides of the back plate 68 by connection links 88A, 88B and 88C, respectively. Accordingly, as shown in the figure, the exerting direction of the pressing force that is exerted on the back plate 68 by the actuators 70A, 70B and 70C become in parallel with each other.

At the time of actual polishing, the main pushing or pulling load (hereinafter referred to as "pressing force") with respect to the polishing surface 2a of the object 92 is adjusted by the actuator 70B, and a rough balance of the pressing force in the longitudinal direction of the object 92 is adjusted by other actuators 70A and 70B. Therefore, the exertion of the pressing force by the actuators 70A, 70B and 70C may be partially changed to a pulling force in accordance with a variation in the degree of the polishing amount and a portion to be polished in the longitudinal direction of the object to be polished 92.

Figure 11:
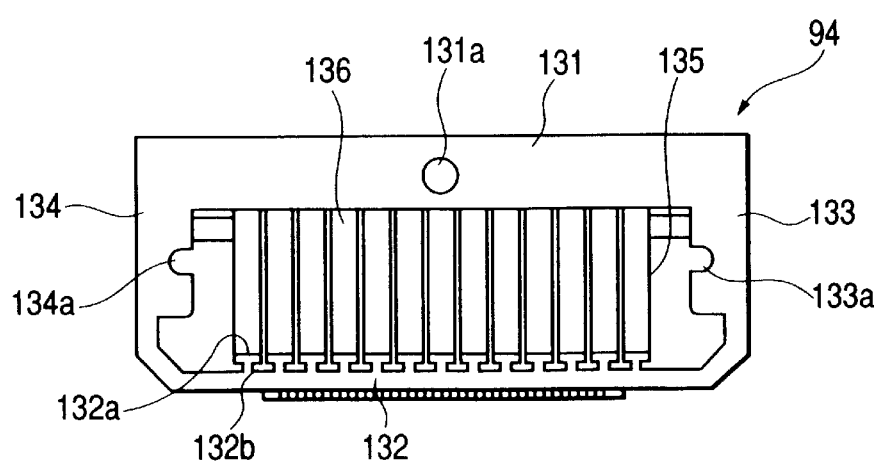
FIG. 11 is a front view showing a lateral longitudinal jig in accordance with an embodiment of the present invention.
Figure 12:
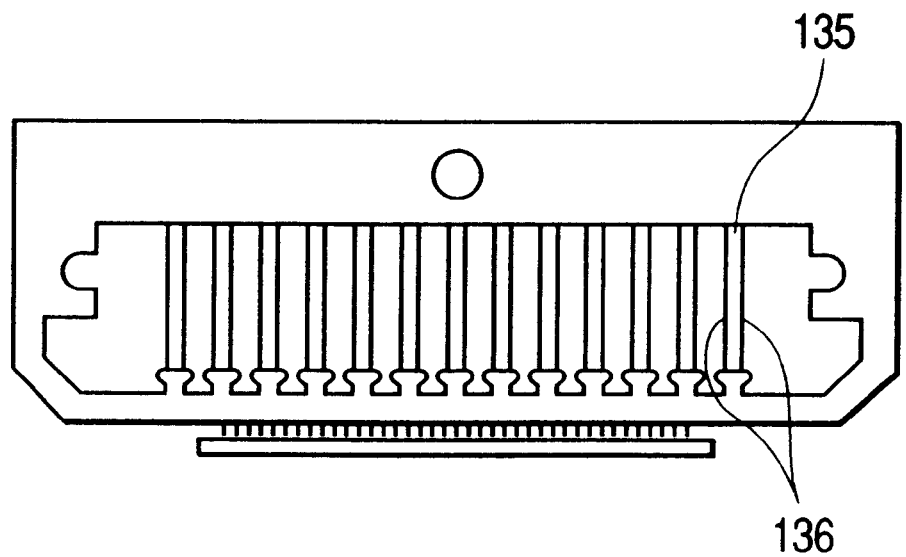
FIG. 12 is a front view showing a modified example of the lateral longitudinal jig shown in FIG. 11.
Figure 13:
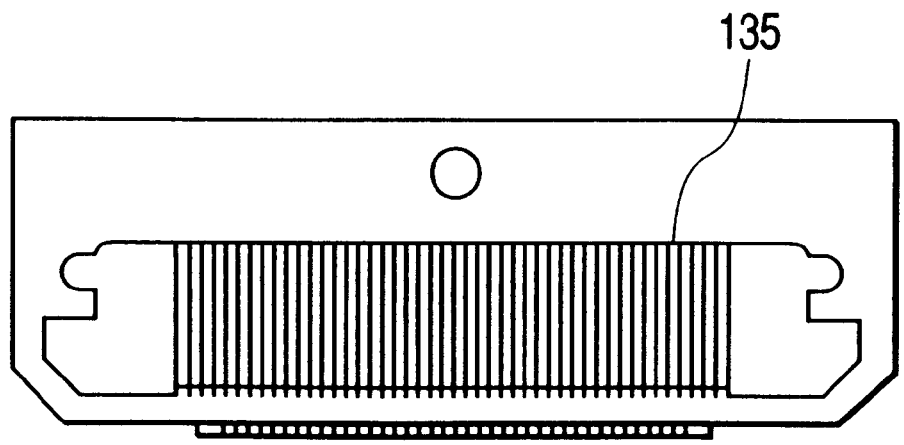
FIG. 13 is a front view showing another modified example of the lateral longitudinal jig shown in FIG. 11.

The back plate 68 is connected to a lateral longitudinal jig 94 through a rectangular plate-shaped portion 90, a support pin 96, positioning pins 97A, 97B and a connecting member 122. FIGS. 11 to 13 show front views of the lateral longitudinal jig 94. The lateral longitudinal jig 94 is made up of a main body portion 131, a holding portion 132 and connecting portions 133, 134 which are formed integrally, and a plurality of micro-actuators 135 both ends of which are fixed to the main body portion 131 and the holding portion 132. The holding portion 132 is formed with a groove portion 132b between the fixing portions 132a to which the micro-actuators 135 are fixed so that a different deformation is readily conducted for each of the portions pressed by the adjacent micro-actuators.

A through-hole 131a is formed at the center portion of the main body portion 131 in the longitudinal direction, and the through-hole 131a passes from the front surface side of the jig to the back surface side thereof. A support pin 96 that penetrates the through-hole 113a is fixed to the connecting member 122 by a screw, a nut or the like, to thereby fix the lateral longitudinal jig 94 to the back plate 68. In addition, since the positioning pins 97A and 97B inserted into recess portions 133a and 134a which are formed in parallel with the through-hole 131a in the connecting portions 133 and 134 are fixed to the connecting member 122 as with the support pin 96, the lateral longitudinal jig 94 can be fixed to a given position with respect to the back plate 68.

In this situation, as mentioned above, it is necessary that the fixing position is shifted from the exposure boundary 172 in advance so that the locations of the micro-actuators 135 and the fixing portions 132a are not positioned on or just above the exposure boundary 172, and the same attention is paid when the object 92 is fixed to the lateral longitudinal jig 94. Also, in the case where one micro-actuator 135 corresponds to each of the elements 170, it is necessary to determine the fixing position of the actuator and to fix the object 92 so that each of the actuators 135 is positioned just above the respective elements 170.

In this embodiment, each of the micro-actuators is formed of a laminate-type actuator made of a piezoelectric element. The piezoelectric element actuator is formed by stacking and fixing a plurality of square thin plate-shaped piezoelectric elements and is shaped in a column. It is necessary that a pair of columnar side surfaces that face each other are formed with an electrode 136 that electrically connect to the respective thin plate-shaped piezoelectric elements to each other. The electrode 136 needs to attached with a voltage supply wiring for applying a drive voltage. When the piezoelectric actuator is attached to the lateral longitudinal jig 94, a space required for the electrode wiring, the anisotropy of the strength of the actuator per se, the number of the piezoelectric actuators to be attached, an attaching space where the piezoelectric actuator is attached, and the like should be taken into consideration.

FIG. 11 shows a structure in which the electrode 136 disposed on the piezoelectric element is disposed on a surface which is in parallel with a front surface and a rear surface of the lateral longitudinal jig 94, that is, a structure having a load applied point 116a shown in FIG. 2. Also, FIG. 13 shows a structure of the lateral longitudinal jig 94 in which one piezoelectric actuator is disposed on each of elements formed on the object 92, that is, a front view of a structure having a load applied point 116a shown in FIG. 3. The lateral longitudinal jigs 94 shown in FIGS. 11 and 13 are not different in structure from each other except that the piezoelectric actuator is downsized and the number of the piezoelectric actuators greatly increases.

The object 92 to be polished which is fixed to the holding portion main body 132c is slender square bar shaped ceramic bar (which is separated into thin film magnetic head sliders, respectively) on which a large number of magnetic head element portions are formed of magnetic thin film patterns disposed in a line, and the magnetic thin film patterns of those element portions are disposed on one longitudinal side surface of the ceramic bar. Therefore, the bottom surface of the ceramic bar is polished, thereby being capable of reducing the throat height and the MR height at the element portion formed on the above-mentioned longitudinal side surface.

Up to now, as described above, the balance of the pressing force against the polishing surface of the object is adjusted by the balance adjustment of the load by the actuators 70A, 70B and 70C, to thereby correct the distortion, the bend or the like which exists in the object 92. Similarly, in the present invention, the main load applied in order to press the object 92 toward the polishing surface 2a at the time of polishing is given by those three actuators. However, the balance of the load in the longitudinal direction is adjusted by driving the plurality of micro-actuators 135 that are included in the lateral longitudinal jig 94 by required amounts, respectively, except for, for example, a case where the polishing amount is large.

Therefore, it is necessary to obtain the required drive amount of the respective micro-actuators 135, that is, the polishing amount at the time of polishing or before the polishing process. A specific example in which the polishing amount required at the time of polishing is obtained, and the micro-actuator is driven on the basis of the polishing amount will be described below. In this embodiment, an additional electrode other than the element is disposed on the longitudinal side surface of the ceramic bar, and a variation of the resistance of the additional electrode is monitored, to thereby obtain the polishing amount at the time of monitoring and obtain a further required pressing force on the basis of the obtained polishing amount. That is, the polishing amount of the object 92 is managed by conducting polishing under a so-called closed loop control.

For that reason, electrode electrically connected to the additional electrode by wire bonding in advance is formed on the surface 94a of the lateral longitudinal jig 94 at the back plate side. Measurement pins 128 (refer to FIG. 6) urged by a spring not shown, or the like, are mounted on the rectangular plate-shaped portion 90, and when the lateral longitudinal jig 94 is fixed to the rectangular plate-shaped portion 90, the above electrode and the measurement pin 128 are brought in contact with each other. In addition, the measurement pin 128 is connected to a resistance measuring means not shown, and the resistance of the additional electrode can be measured by fixing the lateral longitudinal jig 94 to the rectangular plate-shaped portion 90.

Figure 14:
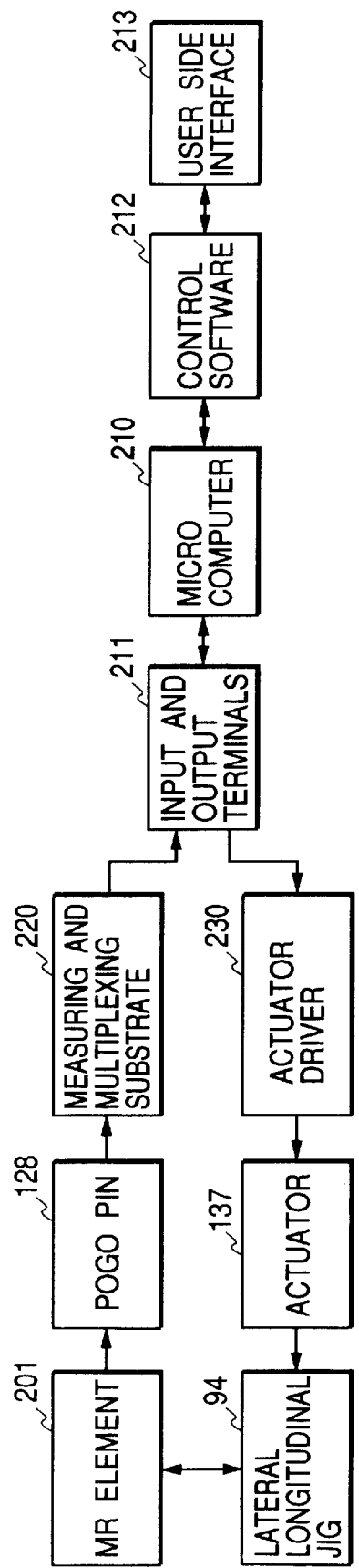
FIG. 14 is a block diagram showing polishing amount control in accordance with an embodiment of the present invention.
Figure 15:
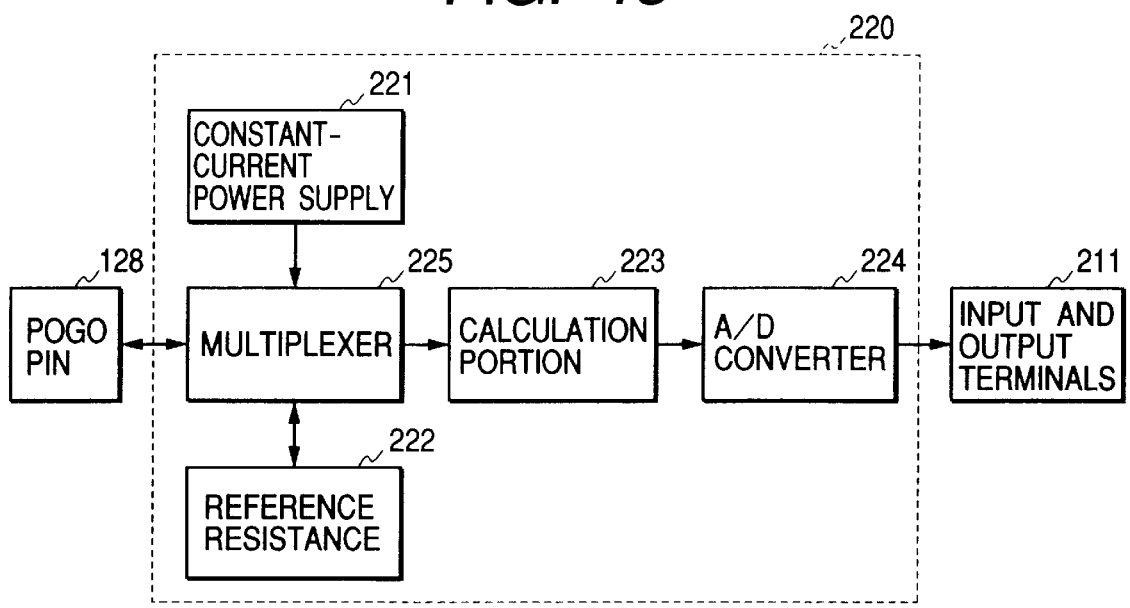
FIG. 15 is a diagram showing the details of measurement and a multiplexing substrate shown in FIG. 14.
Figure 16:
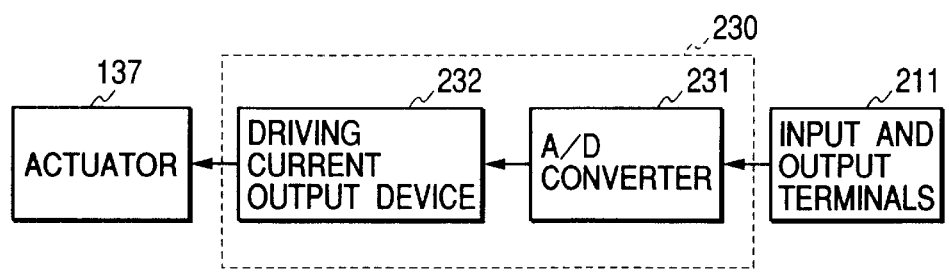
FIG. 16 is a diagram showing the details of a microactuator drive substrate shown in FIG. 14.

Specific structures of the resistance measuring means and the micro-actuator control means will be described below. FIG. 14 shows a block diagram including the measuring means and the control means, of the control for driving the micro-actuator on the basis of the resistance of the measured additional electrode, FIG. 15 shows a block diagram of the details of the measurement and a multiplexing substrate 220, and FIG. 16 shows a block diagram of the details of an actuator drive substrate. In this embodiment, because the resistance is measured by a four terminal method, a plurality of measurement pins 128 are brought in contact with a single additional electrode 201.

A voltage obtained by the additional electrode 201 through the measurement pin 128 using the measurement and the multiplexing substrate 220 is converted into a resistance on the basis of arithmetic operation used for a known four terminal method. In addition, those resistances are converted and multiplexed as digital data and then inputted to an input/output terminal 211 of a microcomputer 210. Further, the polishing amount of the object 92 is calculated on the basis of the data inputted to the computer 210 and the calculated polishing amount is indicated for an operator.

The above-described signal processing of from the measurement of the resistance to the output of digital data will be described in detail with reference to FIG. 14. In the measuring and multiplexing substrate 220, the supply of a current from a constant current power source 221 with respect to a plurality of measurement pins 128, the measurement of a voltage between the respective pins, and numerical operation on the basis of a comparison of the measured value with a value of a correction resistor 222 in the arithmetically operating portion 223 are sequentially conducted, to thereby obtain the resistance of the additional electrode. The obtained value is further converted by an A/D converter 224 as digital data.

The required polishing amount on the additional electrode forming portion and in the vicinity thereof which is measured on the surface to be polished 92a is obtained from the digital data which has been converted through the above procedure. Then, in order to conduct the polishing of the required amount, the drive amount required by the respective micro-actuator 135 is obtained as the drive amount data by the computer 210. The drive amount data is inputted to the actuator drive substrate 230 from the computer 210 through the input terminal 211.

Those data is converted into a control signal in the micro-actuator drive substrate 230, and a drive current is outputted to the respective micro-actuators 135 from a drive current output device 232 that receives the control signal. The respective micro-actuators finely adjust the pressing force toward the object 92 through the holding portion body 132c of the lateral longitudinal jig 94 in accordance with the outputted drive current, to thereby finely adjust the pressing balance toward the polishing surface 2a of the object 92 in the longitudinal direction.

The use of the lateral longitudinal jig having the above-mentioned built-in micro-actuators 135 and the execution of the control of the micro-actuators due to a closed loop enable polishing while monitoring the polishing amount and can cope with a case where an allowable range of a variation in the polishing amount becomes smaller.

Subsequently, a description will be given of the operation in the case of measuring the polishing amount at all times and adjusting the pressing force against the polishing surface of the object on the basis of the measured result and a polishing method in the embodiment of the present invention. First, the lateral longitudinal jig 94 that holds the object 92 in which a plurality of thin film magnetic head elements are disposed is attached to the rectangular plate-shaped portion 90 of the back plate 68 through the connection member 122 and the fixing pin 96 at a position where as shown in FIGS. 4 and 5, the polishing head 20 is out of the polishing bed 2. In this situation, the additional electrode and the electrode disposed on the side surface 94a of the lateral longitudinal jig have been already subjected to wire bonding, and the measurement pin 128 comes in contact with the above electrode.

Also, as described above, when the object 92 is fixed to the lateral longitudinal jig 94, attention must be paid so that the positional relationship between the element 170 and the micro-actuator 136 is set to a given relationship. Thereafter, the tilting angle of the back plate 68 with respect to the polishing head 20 is initially set to be 0° (a position perpendicular to the bottom surface of the adjust ring 26, that is, a position perpendicular to the polishing bed 2a).

For example, in the case where the elements or the like are disposed on the object that requires a very large polishing amount in order to obtain a given throat height due to the structure of the object to be polished, there may be case in which rough polishing is conducted by another device in advance before the above attaching work. In this embodiment, the rough polishing is conducted in a state where the object 92 is held by the lateral longitudinal jig 94, but the object to be polished 92 may be fixed to another jig (not shown) to conduct rough polishing, and after the rough polishing is completed, the object to be polished 92 may be removed from the jig so as to be fixed to the lateral longitudinal jig 94 again.

After the setting of the tilting angle of the back plate 68 and the attachment of the lateral longitudinal jig 94 are completed, the polishing head mounted frame 12 attached to the polishing head 20 is moved linearly along the guide rail 8 and positioned above the polishing bed 2 which is being rotationally driven. In addition, a part of the lower surfaces of a plurality of columnar dummies 38 embedded in the lower surface of the adjust ring 26 is opposite to the polishing surface 2a of the upper surface of the polishing bed 2, and the polishing head mounted frame 12 is moved downwardly so that the part becomes in contact with the polishing surface 2a due to an appropriate pressing force.

Further, the actuators 70A, 70B and 70C are driven to adjust the respective parallel pressing forces exerted on the center, the right and left sides of the back plate 68 so as to obtain a state where the object 92 is substantially uniformly pressed against the polishing surface 2a. In this embodiment, the main pressing force is obtained from the center actuator 70B, and at this stage, the left and right actuators 70A and 70C give the pressing force of the degree that the actuators supports the back plate 68 so as to fix a state where both ends of the object 92 are brought in contact with the polishing surface 2a. The adjustment may be conducted by eye view or may be conducted by using a contact sensor, or the like. Also, the large bend of the object 92 is measured in advance, and the balance of the pressing force given by the actuators 70A, 70B and 70C may be adjusted so as to correct the bend in accordance with the measured result.

In this state, the polishing of the object 92 is executed. The measurement of the polishing amount due to the measurement of the resistance of the additional electrode is conducted at all times from the start of polishing, the required polishing amount at the respective additional electrode forming positions at the respective times of the polishing process is obtained. The drive amount of the respective micro-actuators are controlled in accordance with the required polishing amount thus obtained to obtain the desired throat height, and the like. In the case where the bend of the object is large and the variation in the required polishing amount is large, it is preferable that the balance of the pressing force due to the actuators 70A and 70C is adjusted in advance, and thereafter the drive amount of the micro-actuator is adjusted.

If the same portion of the adjust ring 26 is in contact with the polishing bed 2 during the polishing process, abrasion deviation is induced. Therefore, the rotation support portion 16 to which the polishing head 20 and the adjust ring 26 are attached is reciprocatingly rotated within a given angle range by the polishing head swinging motor 32, and the polishing head mounted frame 12 is reciprocatingly moved within a given range. Therefore, the polishing head 20 and the adjust ring 26 conduct a motion where the reciprocating rotation motion and a reciprocating linear motion are superimposed on each other during the polishing process.

Through the above method, the ceramic bar can be polished while the bend of the ceramic bar which is an object is corrected, and the positional displacement between the respective elements which is caused at the time of forming the element is corrected at the same time. Therefore, it is possible to conduct polishing in accordance with each of the elements formed on the ceramic bar, and also it is possible to fall a value such as the throat height within an allowable range over the overall length of the ceramic bar.

In this embodiment, a low abrasion air cylinder is used as an actuator. However, various low frictional cylinders such as an electromagnetic type can be employed. Also, in this embodiment, three actuators are employed to compensate for the shortage of the drive stroke of the micro-actuators. However, in the case where the drive stroke of the micro-actuators per se is sufficiently larger, a device made up of only the center actuator 70B can be structured. In addition, in this embodiment, the piezoelectric element actuator is used for the micro-actuator. However, the present invention is not limited to the piezoelectric element actuator but the actuator may be structured by an electrostriction, an air cylinder, or the like.

Also, in this embodiment, the control due to the closed loop is conducted on only the respective micro-actuators, but there may be a case in which the obtained required polishing amount is out of the drive range of the micro-actuator. As a countermeasure against this case, in the case where the obtained required polishing amount is larger than a given amount, a sub-routine in which the drive amount or the pressing force of one end actuators 70A, 70B and 70C are controlled to reduce the required polishing amount may effected, and thereafter the control of the micro-actuator due to the above closed loop may be again conducted.

Also, in the polishing device according to this embodiment, in order to obtain the uniform throat height, and the like, over the entire portion to be polished 92a, the adjust ring is fitted to the lower portion of the polishing head so that the postures of the object 92 and the lateral longitudinal jig 94 are more strictly controlled. However, in the present invention, the adjust ring is not always required, and in the case where the sufficient position control is enabled by only the polishing head, the adjust ring is removed so that the device structure may be more simplified.

Also, in this embodiment, the fixing of the object 92 to the lateral longitudinal jig 94 is conducted by a thermoplastic adhesive. However, the present invention is not limited to the thermoplastic adhesive, but the fixing may be conducted by another adhesive such as a thermosetting adhesive, a sticking material formed of a resin or the like, an electrostatic adsorption, a vapor adsorption or the like.

Second Embodiment

In the first embodiment of the present invention, a plurality of micro-actuators 135 are provided on the lateral longitudinal jig 94, and a load is applied to the load applied point 116a by those micro-actuators. However, the load applied to the load applied point 116a is not limited to the load applied by the micro-actuators held by the lateral longitudinal jig 94. For example, a plurality of driver portions or load generating portions are disposed on portions on the polishing head except for the lateral longitudinal jig, and the drive or the load is given to the holding portion 132 of the lateral longitudinal jig 94, to thereby deform the holding portion and the object to be polished. The specific example will be described below.

Figure 17:
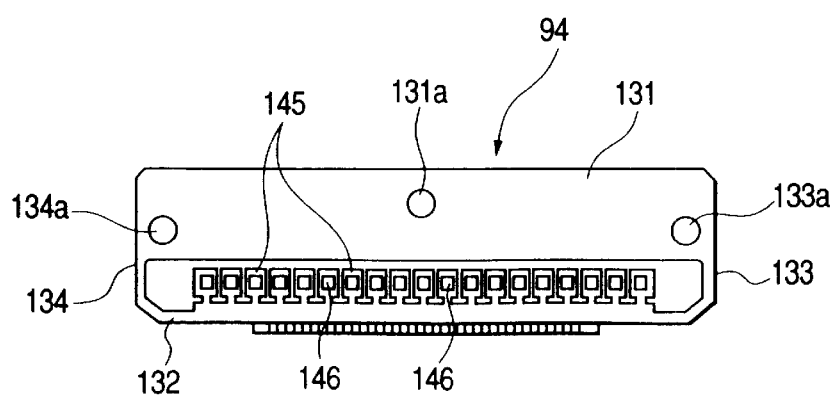
FIG. 17 is a front view showing a lateral longitudinal jig in accordance with a second embodiment of the present invention.

In this case, it is necessary that the lateral longitudinal jig can be deformed by exertion of the load from the external. An example of the lateral longitudinal jig in this case is shown by a front view of FIG. 17. The micro-actuators 136 are eliminated and a plurality of load receiving portions 145 having load receiving holes 146 are disposed on a holding portion 132 instead, which is different from the lateral longitudinal jig 94 shown in FIG. 11. The load produced by the load generating portion is given to the holding portion 132 through a pin or the like inserted into, for example, a load receiving hole 146, thereby being capable of deforming the holding portion. Because the number of load receiving holes is set in accordance with the number of load generating portions, the example shown in FIG. 17 shows a case of having the nineteen load generating portions.

Figure 18:
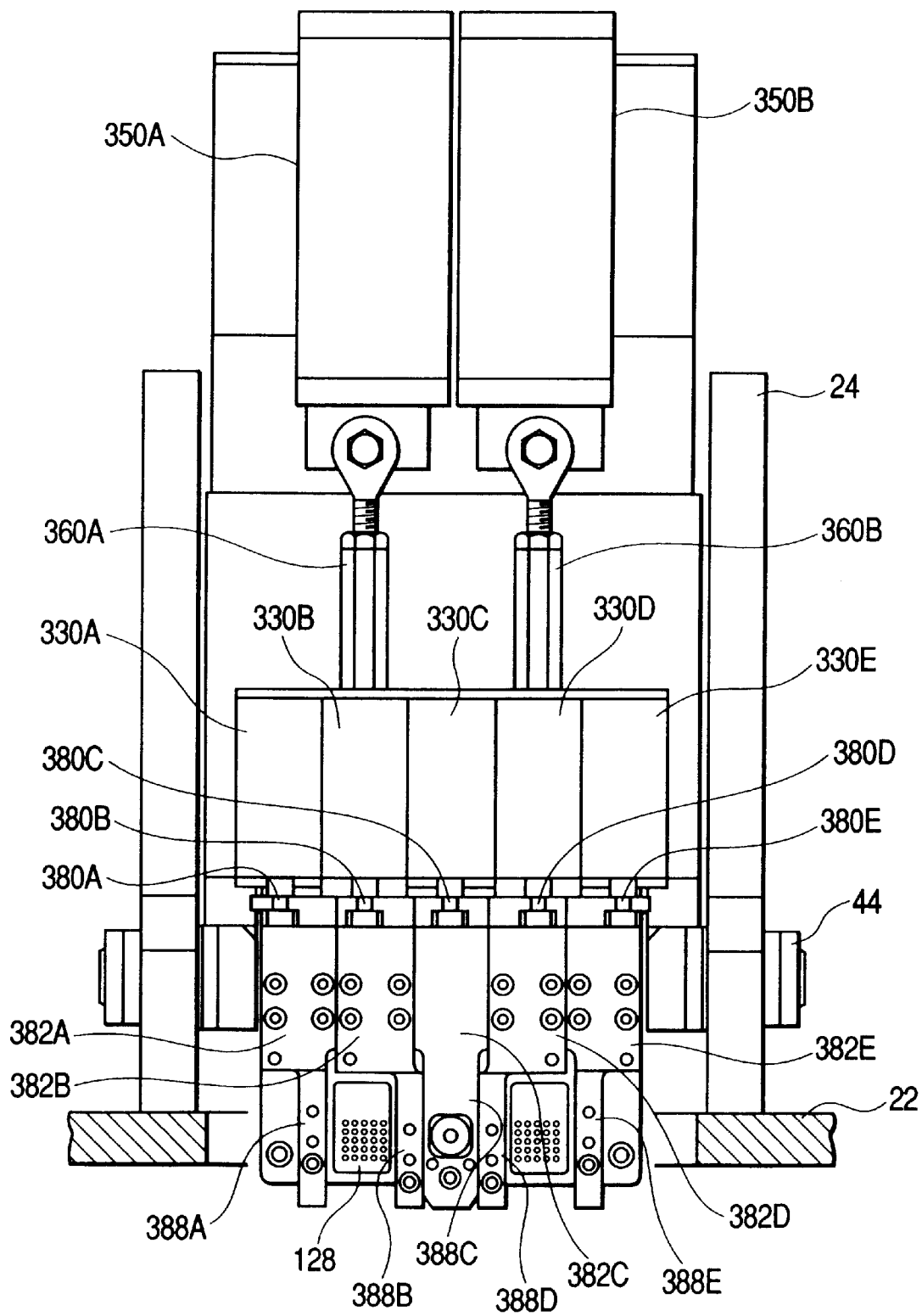
FIG. 18 is a front view showing a polishing head in accordance with the second embodiment of the present invention, in the case where the number of points to which loads are applied is relatively small.

An example of the polishing head where a plurality of driver portions are disposed on portions other than the lateral longitudinal jig is shown in FIG. 18. FIG. 18 is a diagram showing the outline of a front view of the polishing head 20. The polishing head 20 is made up of a pair of REC plungers 350A and 350B for adjusting the parallel degree of the object 92 with respect to the polishing surface 2a and correction low frictional cylinders 330A to 330E that apply a load to the holding portion.

The correction low frictional cylinders 330A to 330E are fitted with rods 380A to 380E, respectively. The lower ends of those rods are connected with sliders 382A to 382E so as to be vertically movable along a slide bearing (not shown) attached to the elevating portion 64. Each of the sliders can be rotated by about 5° as an angle with respect to the driving directions of the respective cylinders so as to correct the axial displacement of the sliders and the low frictional cylinder driver shaft.

The lower ends of those sliders 382A to 382E are also connected with correction elevating members 388A to 388E, pins are fixed to those correction elevating members 388A to 388E, and those pins are inserted into the above load receiving holes 146. In this case, five load receiving portions 145 and five load receiving holes 146 are disposed in the lateral longitudinal jig 94, respectively. The five load generating portions is small in number, but they are provided for the purpose of correcting only the positional displacement caused in the exposure boundaries 172, and in the case where the number of exposure boundaries 172 is four, a required deformation of the object 92 can be obtained by such a structure.

Figure 19:
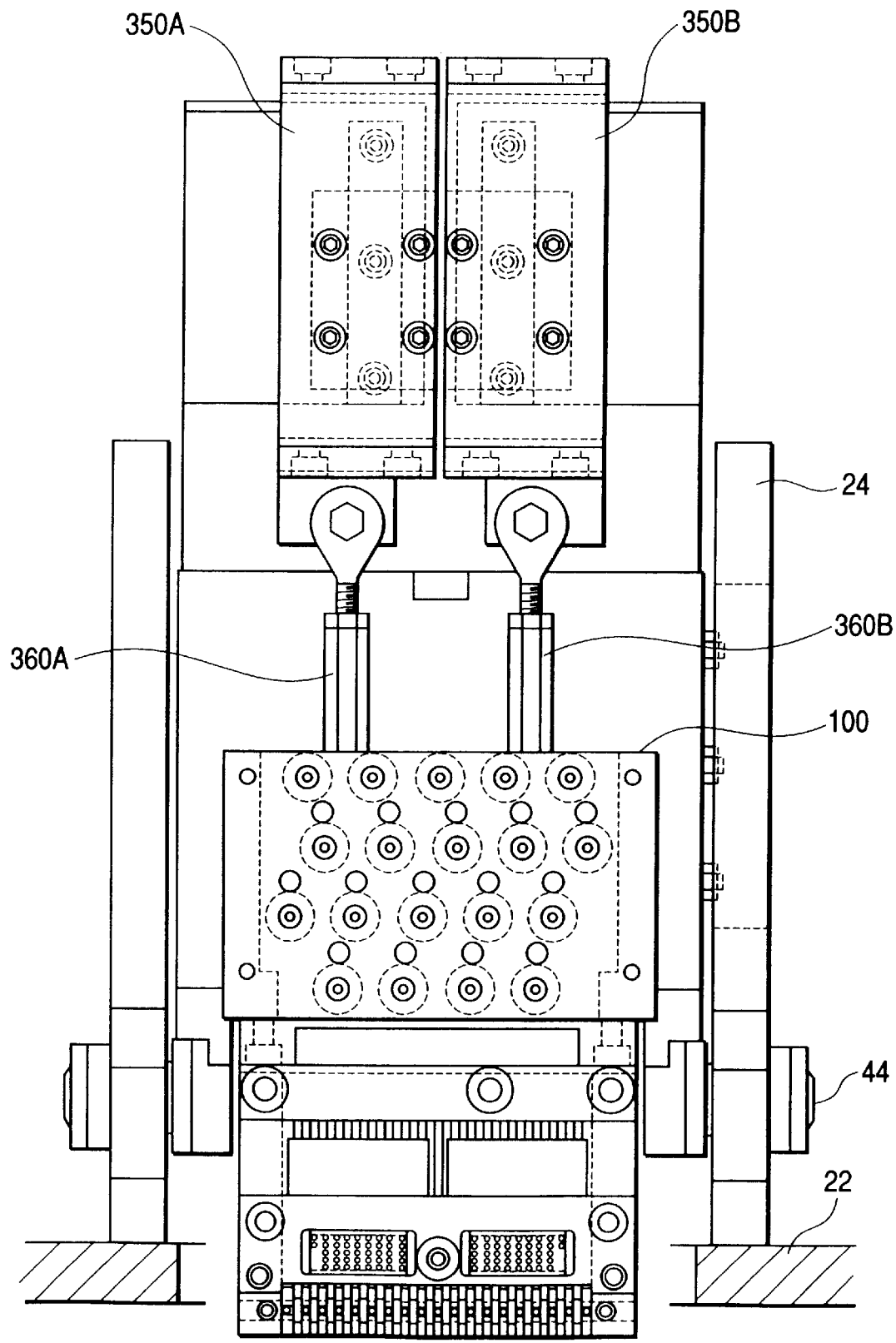
FIG. 19 is a front view showing the polishing head in accordance with the second embodiment of the present invention, in the case where the number of points to which loads are applied is relatively large, or in the case where the respective elements have points to which the loads are applied.

Subsequently, an example of the structure of the polishing head 20 having more increased load generating portions will be described with reference to the accompanying drawings. FIG. 19 shows a front view of the polishing head 20. A difference between the polishing head 20 shown in FIG. 19 and the polishing head shown in FIG. 18 is only that the structural portion made up of the correction low frictional cylinders 330A to 330E is replaced by a correction mechanism 100, and therefore the correction mechanism 100 will be described in detail below.

Figure 20:
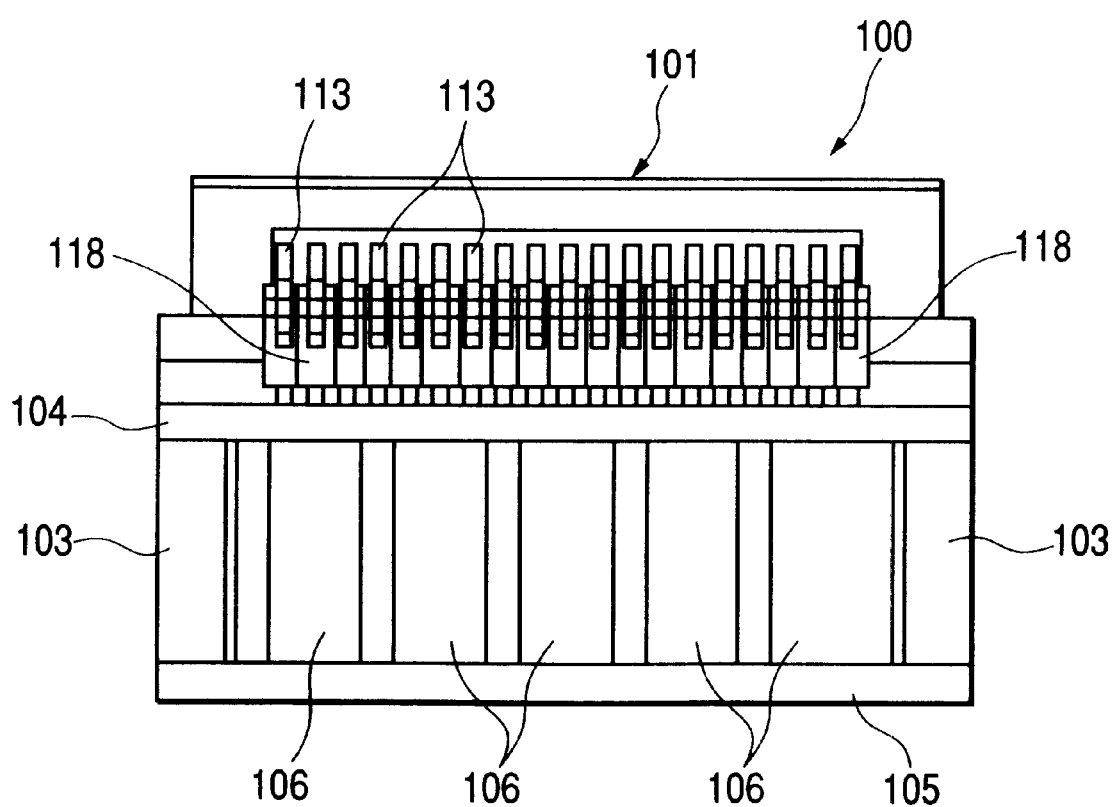
FIG. 20 is a plan view showing a correction mechanism 100 in the polishing head shown in FIG. 19.
Figure 21:
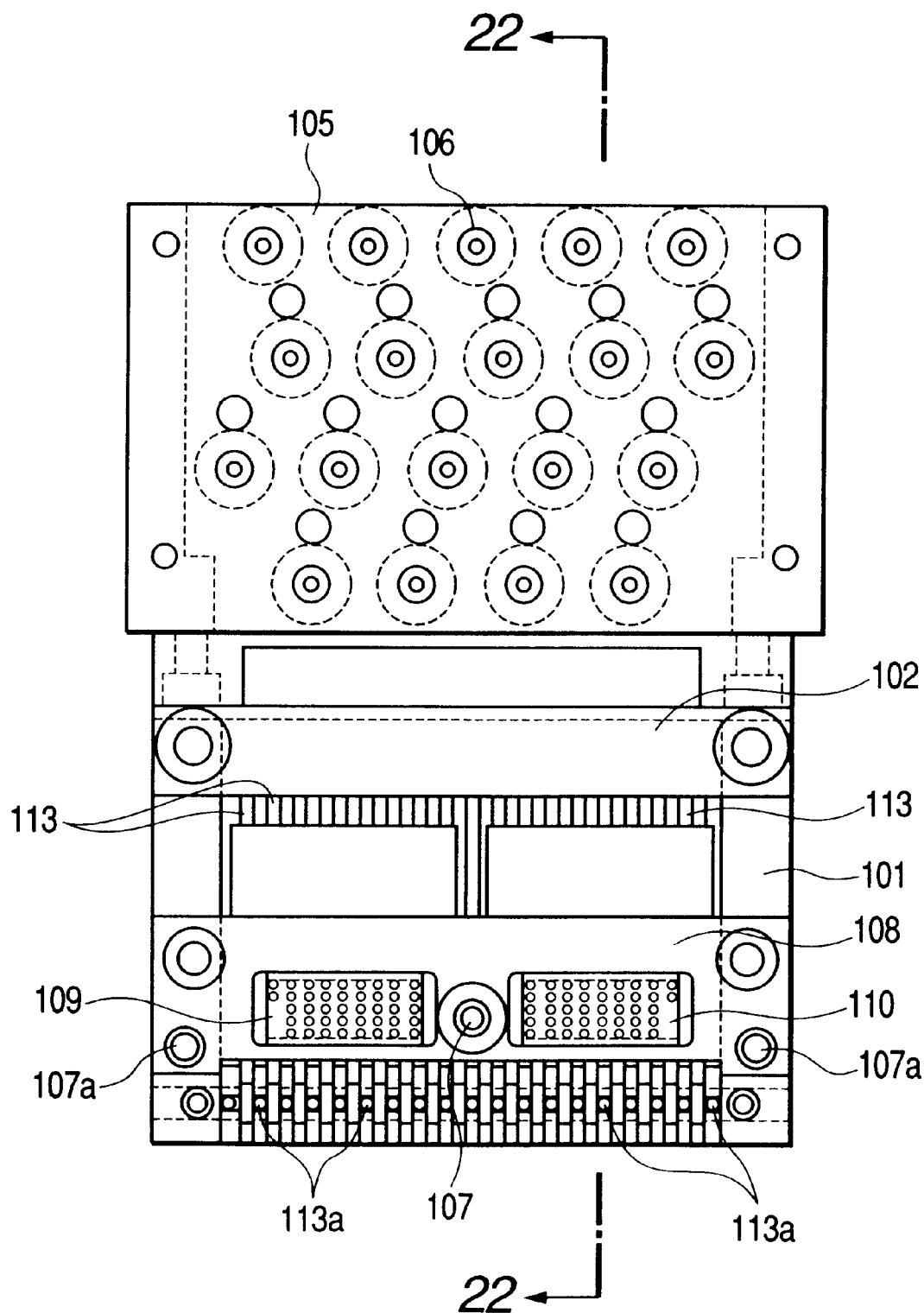
FIG. 21 is a front view showing the correction mechanism 100 in the polishing head shown in FIG. 19.
Figure 22:
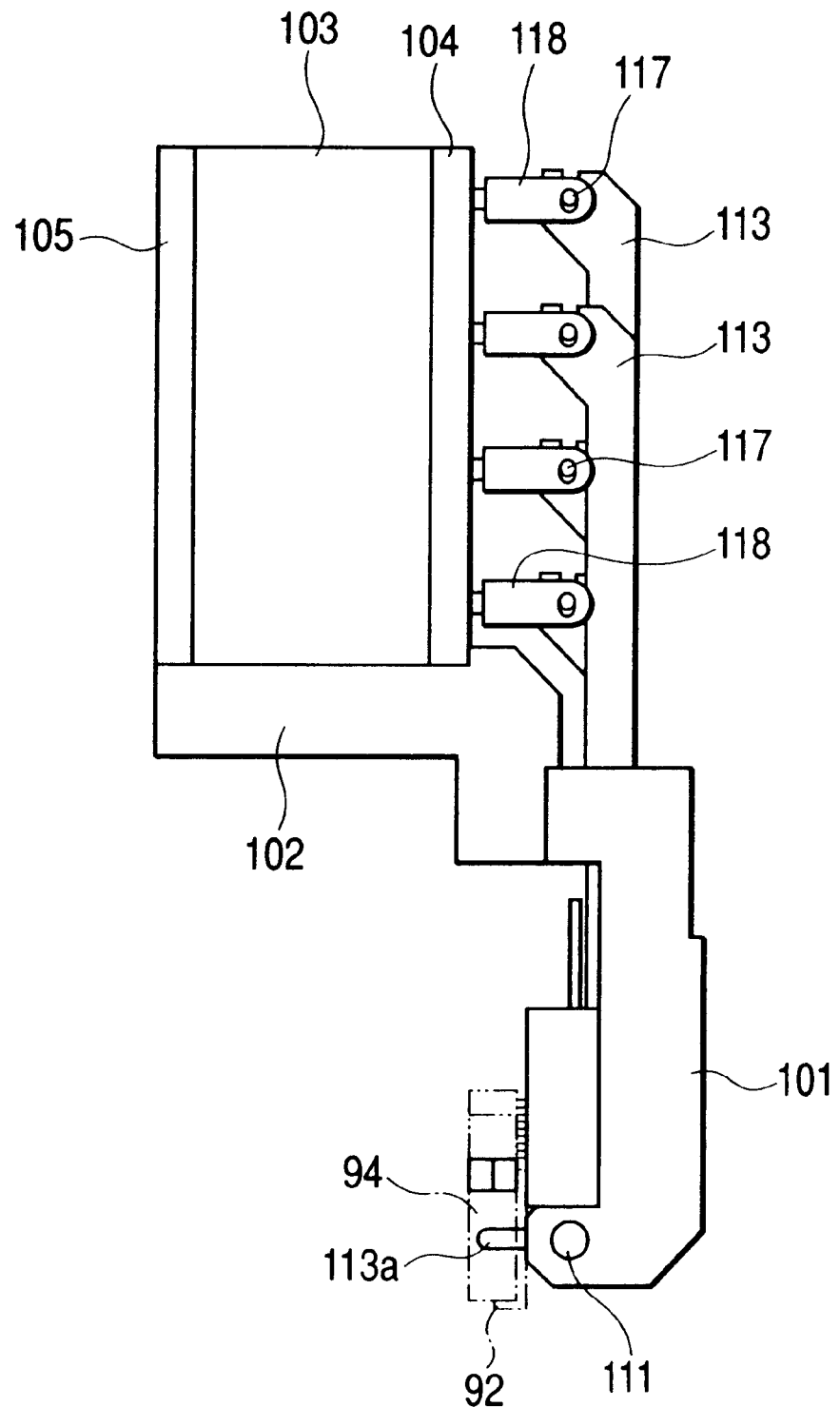
FIG. 22 is a partially cross-sectional view showing the correction mechanism 100 shown in FIG. 21, taken along a line 22—22.

FIGS. 20, 21 and 22 show a plan view, a front view and a schematic cross-sectional view of the correction mechanism 100, respectively. A base 101 is fixed to a back plate 68 by a spring or the like so as to be substantially in parallel with the back plate 68, to thereby fix the correction mechanism 100 per se to the back plate 68. A bracket 103 is fixed on the top portion of the base 101 through the holder 102, and both side surfaces of the bracket 103 are disposed so as to be substantially in parallel with the back plate 68. The plates 104 and 105 are fixed to both side surfaces of the bracket 103 in parallel, and a plurality of correcting actuators 106 serving as the correction drive means is held at a given position by being interposed between those two plates.

Figure 23:
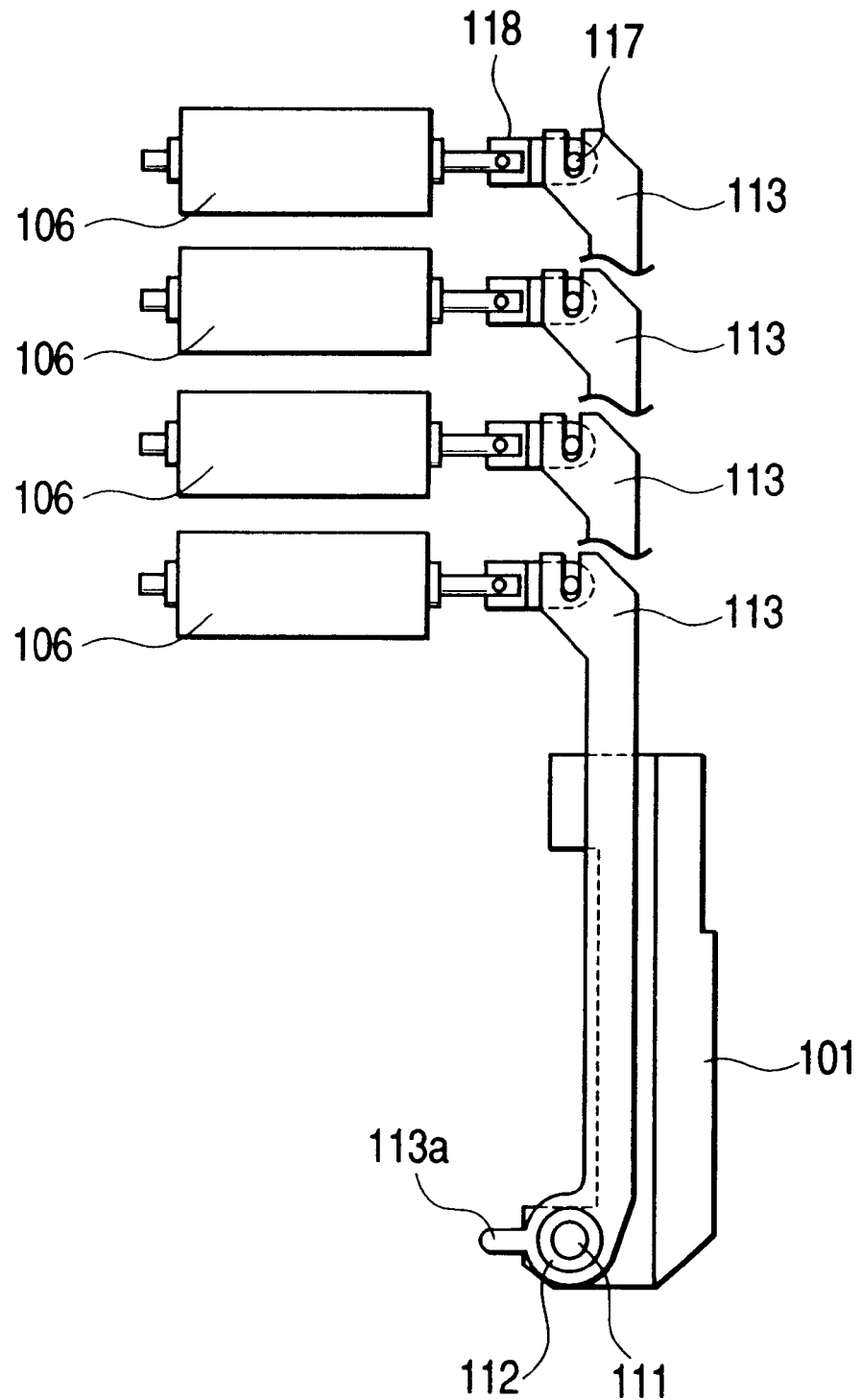
FIG. 23 is a diagram for explanation of a driving portion of the correction mechanism shown in FIG. 19.

FIG. 23 shows a side view of the structure of the drive portion of the correction mechanism 100. As shown in the figure, the correcting actuator 106 is designed in such a manner that the drive portion thereof is connected to one end of a lever 113 extending in a direction substantially perpendicular with respect to the driving direction, through a joint 118 and a pin 117. In addition, the lever 113 is rotatably supported through a bearing 112 by a shaft 111 fixed to the base 101, and rotates about the shaft 111 by driving the correcting actuator 106. The shaft 111 is positioned as the center of rotation of the lever 13, and the lever 13 is provided with a pin 113a at another end portion of the connection portion with the above drive portion.

In the correction mechanism, a position where the shaft 111 supports the lever 113 is disposed in the vicinity of the pin 113a, as a result of which the drive force obtained from the correcting actuator 106 is amplified due to a lever's principle, and the pins 113a can be finely controlled. The leading ends of the pins 113a are machined into spheres, and the leading ends are driven in a direction substantially perpendicular to the actuator driving direction (in a direction substantially perpendicular to the polishing surface 2a) due to the drive of the correcting actuator 106.

As is understood from the figure, because an interval between the adjacent pins 113a is small as compared with the size (a diameter in this case) of the correcting actuators 106 used in this embodiment, the correcting actuators 106 cannot be merely disposed in parallel. Therefore, as shown in FIG. 23, the respective correcting actuators 106 are alternately disposed by differing the lengths of the levers 113, respectively, to thereby provide a holding space of the correcting actuators 106. In this case, the drive amount of the leading ends of the pins 113a also differ from each other due to the difference of the lengths of the respective levers 113. However, in this embodiment, the respective drive strokes of the correcting actuators 106 are regulated within a given range in advance and the counts when calculating the actual drive amount of the pin 113a are made different at the same time, to thereby hold the drive mounts of the leading ends constant.

A spherical portion of the leading end of each the pin 113a is inserted into the load receiving hole 146 disposed on the load receiving portion 145 when the jig 94 is fixed onto the base 101. The leading end portion of the pin 113a presses the peripheral portion of the load receiving hole 146 in accordance with the drive of the correcting actuator 106, and the load receiving portion 145 is vertically driven. The holding portion 132 is partially deformed by the movement of the load receiving portion 145, and at the same time, the object 92 is also locally deformed.

In this example, the leading end portion of the pin 113a is not vertically linearly moved, but is vertically moved while drawing the circular locus in accordance with the circular rotation around the shaft 111 of the lever 113. For that reason, in this embodiment, the leading end portion is shaped in a sphere, thereby being capable of allowing the leading end portion to slide with respect to the peripheral portion of the load receiving hole 146, and also being capable of smoothly moving the load receiving portion 145 on the leading end portion.

As described above, the arrangement of the pins 113a and the load receiving portion 145 must not be superimposed on the exposure boundaries 172 so that the pins 113a and the load receiving portion 145 is not positioned on or just above the exposure boundaries 172. Also, the same attention must be paid when the object 92 is fixed to the lateral longitudinal jig 94. In addition, in the case where one pin 113a and the load receiving portion 145 correspond to the respective elements 170, it is necessary to determine the arrangement of the one pin 113a and the load receiving portion 145 and to fix the object 92 so that the one pin 113a and the load receiving portion 145 are positioned just above the respective elements 170.

The above description was given of the second embodiment of the present invention. A difference between the second embodiment and the first embodiment resides in only whether the load generating portion exists on the lateral longitudinal jig or not. Accordingly, the method of controlling the polishing amount of the object 92 and the operating procedure of the respective actuators, and the like, in the first embodiment are conducted similarly in the second embodiment. Further, the various modifications described in the first embodiment can be conducted in the second embodiment, likewise.

Also, the above-mentioned device structure is a structure for only applying the load onto the holding portion 132, and the present invention pertains to the position on the holding portion 132 to which the load is to be applied, and is not limited by the above structure. Accordingly, various load generating methods and the load applying methods can be adapted to the present invention.

In addition, the above-described embodiments show only the polishing process, but it would be apparent to the ordinary skilled person that the present invention can be applied to not only the polishing process, but also a grinding process or a machining process and the like. Further, the present invention is not limited to the description of the above embodiments of the present invention, and further it would be apparent to the ordinary skilled person that various modifications and alterations can be made within the scope of the respective claims.

According to the machining device and the machining method of the present invention, complicated bend deformation or the like is given to the ceramic bar or the like in accordance with the positional displacement which occurs when the electromagnetic conversion element or the like is formed on the object to be machined such as the ceramic bar, with the result that the positional displacement of the electromagnetic conversion element or the like can be corrected at the time of polishing.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A polishing device for polishing an object to be polished which is elongated in one direction, in which a plane of the object to be polished extending in a longitudinal direction is divided into a plurality of regions, and a plurality of elements each consisting of at least one of an electromagnetic conversion element and a magnetroelectric conversion element are formed in the longitudinal direction in each of the divided regions, said polishing device comprising:

a polishing bed having a polishing surface which is rotationally driven;

a polishing head mounted frame movably disposed on the polishing surface; and a polishing head supported by said polishing head mounted frame;

wherein said polishing head includes a jig that has a holding portion that extends in the longitudinal direction and holds the object to be polished at a given position of the holding portion, a support portion that supports the jig, an elevating portion that is integrated with the support portion and elevates with respect to the polishing surface, and a plurality of holding portion deforming means each of which gives a load which deforms the holding portion and the object to be polished to the holding portion; and wherein each of the holding portion deforming means is disposed so as not to give the load on boundaries between the plurality of regions.

2. A polishing device according to claim 1 wherein said holding portion deforming means is disposed on said jig.

3. A polishing device according to claim 1, wherein said holding portion deforming means is disposed independently from said jig.

4. A polishing device for polishing an object to be polished which is elongated in one direction, in which a plurality of elements each consisting of at least one of an electromagnetic conversion element and a magnetroelectric conversion element are formed in a longitudinal direction on a plane that extends in the longitudinal direction, said polishing device comprising:

a polishing bed having a polishing surface which is rotationally driven;

a polishing head mounted frame movably disposed on the polishing surface; and a polishing head supported by the polishing head mounted frame;

wherein said polishing head includes a jig that has a holding portion that extends in the longitudinal direction and holds the object to be polished at a given position of the holding portion, a support portion that supports the jig, an elevating portion that is integrated with the support portion and elevates with respect to the polishing surface, and a plurality of holding portion deforming means that give a load which deforms the holding portion and the object to be polished to the holding portion; and wherein each of the holding portion deforming means is disposed so as to give the load to each of the plurality of elements, independently.

5. A polishing device according to claim 4 wherein said holding portion deforming means is disposed on said jig.

6. A polishing device according to claim 4, wherein said holding portion deforming means is disposed independently from said jig.

7. A polishing device according to any one of claims 1 to 6, wherein said polishing head includes an actuator, said jig has a through-hole disposed in a direction perpendicular to a direction along which said holding portion deforming means gives the load in the center of the longitudinal direction, said jig is supported on the support portion by a support pin that penetrates the through-hole, and said actuator effects a force that pushes or pulls up the jig in a direction perpendicular to the polishing surface through the support pin.

8. A polishing device according to claim 7, wherein said polishing head has a correcting actuator, and said support portion has a positioning pin, said jig has a recess disposed at both ends thereof with respect to the longitudinal direction, in a direction perpendicular to the direction along which said holding portion deforming means gives to load on said jig, said jig is positioned by said positioning pin inserted into the recess, and said correcting actuator adjusts a press force with respect to the polishing surface of said jig through said positioning pin.

9. A polishing device according to claim 7, wherein said polishing head has an adjust ring elastically supported by said polishing head mounted frame, and the adjust ring is in contact with said polishing surface while being elastically supported by the polishing head mounted frame so that an angle facing the polishing surface is regulated by said adjust ring.

10. A polishing device according to claim 7, wherein said polishing head is rotatably attached on a polishing head mounting rail.

11. A polishing device according to claim 10, wherein said polishing device has a polishing head swinging means, and said polishing head swinging means allows said polishing head to conduct a reciprocatingly rotating motion within a given angle range.

12. A polishing device according to claim 1 or 4, further comprising:

means for detecting the required polishing amount of the object to be polished and drive means for driving the plurality of holding portion deforming means on the basis of the detected required polishing amount.

13. A polishing device according to claim 12, wherein the object to be polished is made of bar-shaped ceramic where a plurality of magnetic heads are formed.

14. A polishing method of an object to be polished which is elongated in one direction, in which a plane of the object to be polished extending in a longitudinal direction is divided into a plurality of regions, and a plurality of elements each consisting of at least one of an electromagnetic conversion element and a magnetoelectric conversion element are formed in the longitudinal direction in each of the divided regions, said polishing method comprising:

a step of holding the object to be polished by a jig, substantially uniformly pressing the object to be polished, toward the polishing surface formed on the polishing bed rotatably driven, through the jig in the longitudinal direction, and polishing the object to be polished;

wherein when the object to be polished is substantially uniformly pressed toward the polishing surface, a load for adjusting the deformation amount in the periphery of load applied points of the object to be polished in a plurality of load applied points in the longitudinal direction is given to the object to be polished in addition to the substantially uniform press, and the load applied points are disposed at locations other than boundary portions between the divided regions.

15. A polishing method according to claim 14, wherein the load applied points are close to the boundary portions and disposed at both sides of each of said boundary portions.

16. A polishing method of an object to be polished which is elongated in one direction, in which a plurality of elements each consisting of at least one of an electromagnetic conversion element and a magnetoelectric conversion element are formed in the longitudinal direction on a plane that extends in the longitudinal direction, said polishing method comprising:

a step of holding the object to be polished by a jig, substantially uniformly pressing the object to be polished, toward the polishing surface formed on the polishing bed rotatably driven, through the jig in the longitudinal direction, and polishing the object to be polished;

wherein when the object to be polished is substantially uniformly pressed toward the polishing surface, a load for adjusting the deformation amount of the portion on which the plurality of elements of the object to be polished are formed, respectively, is given to the plurality of elements, independently, in addition to the substantially uniform press.

17. A polishing method according to claim 16, wherein the load is given to the plurality of elements except for a center portion between the respective elements.

* * * * *